United States Patent
Ikeda et al.

(10) Patent No.: US 8,400,083 B2
(45) Date of Patent: Mar. 19, 2013

(54) CURRENT DETECTING DEVICE, AIR CONDITIONING APPARATUS, CORRECTION CONSTANT CALCULATING SYSTEM AND CORRECTION CONSTANT CALCULATING METHOD

(75) Inventors: Motonobu Ikeda, Sakai (JP); Masafumi Hashimoto, Sakai (JP); Satoshi Yagi, Sakai (JP); Keisuke Shimatani, Sakai (JP); Hirohito Maeda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 427 days.

(21) Appl. No.: 12/738,328

(22) PCT Filed: Oct. 21, 2008

(86) PCT No.: PCT/JP2008/068993
§ 371 (c)(1),
(2), (4) Date: Apr. 16, 2010

(87) PCT Pub. No.: WO2009/054352
PCT Pub. Date: Apr. 30, 2009

(65) Prior Publication Data
US 2010/0211223 A1   Aug. 19, 2010

(30) Foreign Application Priority Data

Oct. 23, 2007 (JP) .................................. 2007-275504
Oct. 23, 2007 (JP) .................................. 2007-275505

(51) Int. Cl.
*H02P 1/00* (2006.01)
*H02P 3/00* (2006.01)

(52) U.S. Cl. ............... 318/268; 318/434; 318/400.07; 318/618

(58) Field of Classification Search ............ 318/268, 318/434, 618, 723, 400.07, 801; 363/37, 363/97; 62/229, 230
See application file for complete search history.

(56) References Cited

U.S. PATENT DOCUMENTS

| 4,879,502 A | * | 11/1989 | Endo et al. ............... 318/723 |
| 5,463,299 A | * | 10/1995 | Futami et al. ............ 318/618 |
| 5,465,202 A | * | 11/1995 | Ibori et al. ............... 363/37 |
| 5,694,010 A | * | 12/1997 | Oomura et al. ......... 318/400.07 |
| 6,153,993 A | * | 11/2000 | Oomura et al. ........... 318/434 |
| 6,244,061 B1 | * | 6/2001 | Takagi et al. ............. 62/229 |
| 6,367,273 B2 | * | 4/2002 | Takagi et al. ............. 62/230 |
| 6,556,458 B2 | * | 4/2003 | Ohmura et al. ............ 363/37 |
| 2002/0191427 A1 | * | 12/2002 | Ohmura et al. ............ 363/97 |
| 2005/0068001 A1 | * | 3/2005 | Skaug et al. ............. 318/807 |

FOREIGN PATENT DOCUMENTS

| JP | 3-124796 U | 12/1991 |
| JP | 04-240574 A | 8/1992 |
| JP | 2002-51589 A | 2/2002 |
| JP | 2003-111487 A | 4/2003 |

(Continued)

*Primary Examiner* — Paul Ip
(74) *Attorney, Agent, or Firm* — Global IP Counselors

(57) ABSTRACT

A current detecting device includes a current leveling unit, a first wire and a current detecting unit. The current leveling unit is configured to level a drive current that is passed through a motor drive unit to drive a motor. The first wire is configured and arranged to carry flow of a motor current that has been passed through the motor and the drive current that has been leveled by the current leveling unit. The current detecting unit is configured to detect a sum of the motor current flowing on the first wire and the drive current that has been leveled flowing on the first wire.

13 Claims, 15 Drawing Sheets

FOREIGN PATENT DOCUMENTS

| | | |
|---|---|---|
| JP | 2004-135441 A | 4/2004 |
| JP | 2005-192358 A | 7/2005 |
| JP | 2007-274747 A | 10/2007 |
| WO | WO-96/05650 A1 | 2/1996 |

* cited by examiner

CURRENT DETECTING DEVICE, AIR CONDITIONING APPARATUS, CORRECTION CONSTANT CALCULATING SYSTEM AND CORRECTION CONSTANT CALCULATING METHOD

CROSS-REFERENCE TO RELATED APPLICATIONS

This U.S. National stage application claims priority under 35 U.S.C. §119(a) to Japanese Patent Application Nos. 2007-275504 and 2007-275505, filed in Japan on Oct. 23, 2007, the entire contents of which are hereby incorporated herein by reference.

TECHNICAL FIELD

The present invention relates to a current detecting device and an air conditioning apparatus equipped with the current detecting device. The present invention also relates to a correction constant calculating system equipped with the current detecting device and a correction constant calculating method.

BACKGROUND ART

Air conditioning apparatus are equipped with various types of devices such as a compressor and a fan. A motor is often used as the source of power for these devices. The motor is connected to a motor drive unit (called a "driver" below) comprising plural switching elements and can be rotated by a drive voltage that is outputted as a result of each of the switching elements in the driver switching ON and OFF.

Further, sometimes the rotational speed of the motor is controlled to allow the various types of devices such as the compressor and the fan to operate in appropriate states. A motor current that is passed through the motor is often used for such motor rotational speed control. Here, as a method of detecting the motor current, for example, as disclosed in Japanese Patent Publication No. 2005-192358, there is known a technology where a shunt resistor serving as a current detection-use element is connected in series on a wire on which the motor current flows and where the motor current is detected on the basis of both end voltages of the shunt resistor.

SUMMARY

Technical Problem

Incidentally, other than when the motor and the driver are separately disposed, sometimes the motor and the driver are built into a motor device. However, in such a motor device, when the technology pertaining to patent document 1 is applied to detect the motor current flowing in the motor portion, in terms of the configuration of that motor device, the drive current flowing through the driver ends up flowing in addition to the motor current on the wire where the shunt resistor is connected in series, so obtaining an accurate motor current ends up becoming difficult.

Thus, it is an object of the present invention to provide a current detecting device with which an accurate motor current can be obtained and an air conditioning apparatus equipped therewith. It is also an object of the present invention to provide a correction constant calculating system equipped with the current detecting device and a correction constant calculating method.

Solution to the Problem

A current detecting device pertaining to a first aspect of the present invention comprises a current leveling unit, a first wire, and a current detecting unit. The current leveling unit levels a drive current that is passed through a motor drive unit for driving a motor. On the first wire, a motor current that has been passed through the motor and the drive current that has been leveled by the current leveling unit flow. The current detecting unit detects the sum of the motor current and the drive current that has been leveled flowing on the first wire.

According to this current detecting device, the drive current included in the current that the current detecting unit detects is leveled. Consequently, even when the drive current fluctuates, an accurate motor current can be determined on the basis of the sum of the motor current and the leveled drive current that has been detected by the current detecting unit.

A current detecting device pertaining to a second aspect of the present invention is the current detecting device pertaining to the first aspect of the present invention, further comprising a second wire on which the drive current flows. Additionally, the current leveling unit has a resistor and a capacitor. The resistor is connected in series on the second wire. The capacitor is connected to the second wire in parallel with respect to the resistor.

The current leveling unit in this current detecting device is configured by a so-called filter circuit comprising the resistor and the capacitor. In this manner, the current detecting device can level the drive current with the current leveling unit having a simple configuration.

A current detecting device pertaining to a third aspect of the present invention is the current detecting device pertaining to the first or second aspect of the present invention, wherein the motor and the motor drive unit are included in a motor device.

When the motor and the motor drive unit are built into the motor device, in terms of the configuration thereof, it is difficult to separately dispose the wire on which the motor current that has been passed through the motor flows and the wire on which the drive current that has been passed through the motor drive unit flows. However, when the current detecting device pertaining to the present invention is applied in such a case, the drive current is leveled by the current leveling unit, so an accurate motor current can be determined.

A current detecting device pertaining to a fourth aspect of the present invention is the current detecting device pertaining to any of the first to third aspects of the present invention, further comprising a third wire, a storage unit, and a motor current calculating unit. On the third wire, the motor current flows. The storage unit can store a correction constant for correcting the detection result of the current detecting unit. The motor current calculating unit calculates the motor current flowing on the third wire on the basis of the correction constant in the storage unit and the detection result of the current detecting unit.

According to this current detecting device, the motor current is determined on the basis of the detection result of the current detecting unit including the leveled drive current and the correction constant. Consequently, a more accurate motor current can be obtained.

An air conditioning apparatus pertaining to a fifth aspect of the present invention comprises a current detecting device, a fan motor, a fan, and a control unit. The current detecting device is the current detecting device pertaining to the fourth aspect of the present invention. The fan motor is included in a motor device together with the motor drive unit, and the motor current is passed through the fan motor. The fan is driven to rotate by the fan motor. The control unit performs control of the volume of air sent into a room from the fan on the basis of the motor current that has been calculated by the motor current calculating unit of the current detecting device.

According to this air conditioning apparatus, the accurate motor current that has been determined by the current detecting device can be used to perform control such that the volume of air sent into the room becomes constant, for example.

A correction constant calculating system pertaining to a sixth aspect of the present invention comprises a current detecting device, a power meter, and a correction constant calculating unit. The current detecting device is the current detecting device pertaining to the fourth aspect of the present invention which is connected to the motor. The power meter is connected to the third wire of the current detecting device and measures the motor current flowing on the third wire. The correction constant calculating unit calculates the correction constant on the basis of the detection result of the current detecting unit in the current detecting device and the measurement result of the power meter and writes the correction constant it has calculated in the storage unit of the current detecting device.

Usually, the current detecting unit is configured by such as a shunt resistor and an op-amp. However, there are variations in the value of the shunt resistor and in the gain of the op-amp, so sometimes the detection result that has been detected by the current detecting unit ends up being different from the actual value. Further, there are individual differences not only in the current detecting unit but also in the motor itself, and there are variations in the performance of the motor such as its calorific value. In particular, when the motor is rotating, there is a tendency for the variation in the motor to become larger than the variations in each of the parts configuring the current detecting unit, so the variation in the motor ends up further producing a difference between the detection result of the current detecting unit and the actual value. When this happens, there is the fear that this difference will affect motor speed control that is performed using the detection result of the current detecting unit.

However, according to this correction constant calculating system, the correction constant is calculated in a state where the motor, in addition to the power meter and the correction constant calculating device, has been connected to the current detecting device. Here, assuming that the measurement operation of the power meter and the detection operation of the current detecting unit are performed at a time when the motor is rotating, for example, the correction constant is calculated using the detection result of the current detecting unit and the measurement result of the power meter at the time when the motor is rotating. Thus, a correction constant matching the actual variation in the motor is obtained, so it becomes possible to obtain a more accurate motor current using the detection result resulting from the current detecting unit and the correction constant.

A correction constant calculating system pertaining to a seventh aspect of the present invention is the correction constant calculating system pertaining to the sixth aspect of the present invention, wherein the correction constant calculating unit performs the operations of calculating and writing the correction constant before shipment of the current detecting device.

According to this correction constant calculating system, a correction constant matching the actual variation in the motor is already written in the storage unit of the current detecting device that has been shipped. For that reason, when the current detecting device is actually used for detecting the current of the motor, a more accurate motor current can be obtained using the correction constant in the storage unit.

A correction constant calculating system pertaining to an eighth aspect of the present invention is the correction constant calculating system pertaining to the sixth or seventh aspect of the present invention, wherein the correction constant calculating unit calculates the correction constant on the basis of the detection result of the current detecting unit and the measurement result of the power meter at a time when the motor is rotating and the detection result of the current detecting unit at a time when the motor is not rotating.

At a time when the motor is not rotating (that is, at a time when the speed of the motor is about 0 rpm), the motor current becomes substantially 0 A, so the measurement result of the power meter becomes substantially 0 A and the motor current portion of the detection result of the current detecting unit becomes substantially 0 A. Thus, when calculating a correction constant matching the actual variation in the motor, the correction constant calculating system does not use the measurement result of the power meter of substantially 0 A but uses the detection result of the current detecting unit and the measurement result of the power meter at a time when the motor is rotating and the detection result of the current detecting unit at a time when the motor is not rotating. In this manner, the parameters used to calculate the correction constant can be reduced, so calculation of the correction constant becomes easy.

A correction constant calculating method pertaining to a ninth aspect of the present invention is a method of calculating the correction constant in the current detecting device pertaining to the fourth aspect of the present invention which is connected to the motor. The method comprises a measuring step, a calculating step, and a writing step. In the measuring step, a power meter is connected to the third wire and the motor current flowing on the third wire is measured. In the calculating step, the correction constant is calculated on the basis of the detection result of the current detecting unit in the current detecting device and the measurement result of the power meter. In the writing step, the correction constant that has been calculated in the calculating step is written in the storage unit of the current detecting device.

According to this correction constant calculating method, the correction constant is calculated in a state where the power meter and the motor have been connected to the current detecting device. Here, assuming that the measurement operation of the power meter and the detection operation of the current detecting unit are performed at a time when the motor is rotating, when the correction constant is calculated in the calculating step, the detection result of the current detecting unit and the measurement result of the power meter at the time when the motor is rotating are used. Thus, a correction constant matching the actual variation in the motor is obtained, so it becomes possible to obtain a more accurate motor current using the detection result resulting from the current detecting unit and the correction constant.

A correction constant calculating method pertaining to a tenth aspect of the present invention is the correction constant calculating method pertaining to the ninth aspect of the present invention, wherein the measuring step, the calculating step and the writing step are performed before shipment of the current detecting device.

According to this correction constant calculating method, a correction constant matching the actual variation in the motor is already written in the storage unit of the current detecting device that has been shipped. For that reason, when the current detecting device is actually used for detecting the current of the motor, a more accurate motor current can be obtained using the correction constant in the storage unit.

A correction constant calculating method pertaining to an eleventh aspect of the present invention is the correction constant calculating method pertaining to the ninth or tenth aspect of the present invention, wherein in the calculating step, the correction constant is calculated on the basis of the detection result of the current detecting unit and the measurement result of the power meter at a time when the motor is rotating and the detection result of the current detecting unit at a time when the motor is not rotating.

At a time when the motor is not rotating (that is, at a time when the speed of the motor is about 0 rpm), the motor current becomes substantially 0 A, so the measurement result of the power meter becomes substantially 0 A and the motor current portion of the detection result of the current detecting unit becomes substantially 0 A. Thus, when calculating a correction constant matching the actual variation in the motor, the correction constant calculating method does not use the measurement result of the power meter of substantially 0 A but uses the detection result of the current detecting unit and the measurement result of the power meter at a time when the motor is rotating and the detection result of the current detecting unit at a time when the motor is not rotating. In this manner, the parameters used to calculate the correction constant can be reduced, so calculation of the correction constant becomes easy.

Advantageous Effects of the Invention

According to the current detecting device pertaining to the first aspect of the present invention, even when the drive current fluctuates, an accurate motor current can be determined on the basis of the sum of the motor current and the leveled drive current that has been detected by the current detecting unit.

According to the current detecting device pertaining to the second aspect of the present invention, the drive current is leveled by the current leveling unit having a simple configuration.

According to the current detecting device pertaining to the third aspect of the present invention, even when the motor and the motor drive unit are built into a motor device, the drive current is leveled by the current leveling unit, so an accurate motor current can be determined.

According to the current detecting device pertaining to the fourth aspect of the present invention, a more accurate motor current can be obtained.

According to the air conditioning apparatus pertaining to the fifth aspect of the present invention, the accurate motor current that has been determined by the current detecting device can be used to perform control such that the volume of air sent into the room becomes constant, for example.

According to the correction constant calculating system pertaining to the sixth aspect of the present invention, a correction constant matching the actual variation in the motor is obtained, so it becomes possible to obtain a more accurate motor current using the detection result resulting from the current detecting unit and the correction constant.

According to the correction constant calculating system pertaining to the seventh aspect of the present invention, when the current detecting device is actually used for detecting the current of the motor, a more accurate motor current can be obtained using the correction constant in the storage unit.

According to the correction constant calculating system pertaining to the eighth aspect of the present invention, the parameters used to calculate the correction constant can be reduced, so calculation of the correction constant becomes easy.

According to the correction constant calculating method pertaining to the ninth aspect of the present invention, a correction constant matching the actual variation in the motor is obtained, so it becomes possible to obtain a more accurate motor current using the detection result resulting from the current detecting unit and the correction constant.

According to the correction constant calculating method pertaining to the tenth aspect of the present invention, when the current detecting device is actually used for detecting the current of the motor, a more accurate motor current can be obtained using the correction constant in the storage unit.

According to the correction constant calculating method pertaining to the eleventh aspect of the present invention, the parameters used to calculate the correction constant can be reduced, so calculation of the correction constant becomes easy.

DETAILED DESCRIPTION OF EMBODIMENT(S)

A current detecting device pertaining to the present invention, an air conditioning apparatus equipped with the current detecting device, a correction constant calculating system equipped with the current detecting device and a correction constant calculating method will be described below using the drawings.

(1) Configuration

Figure 1:
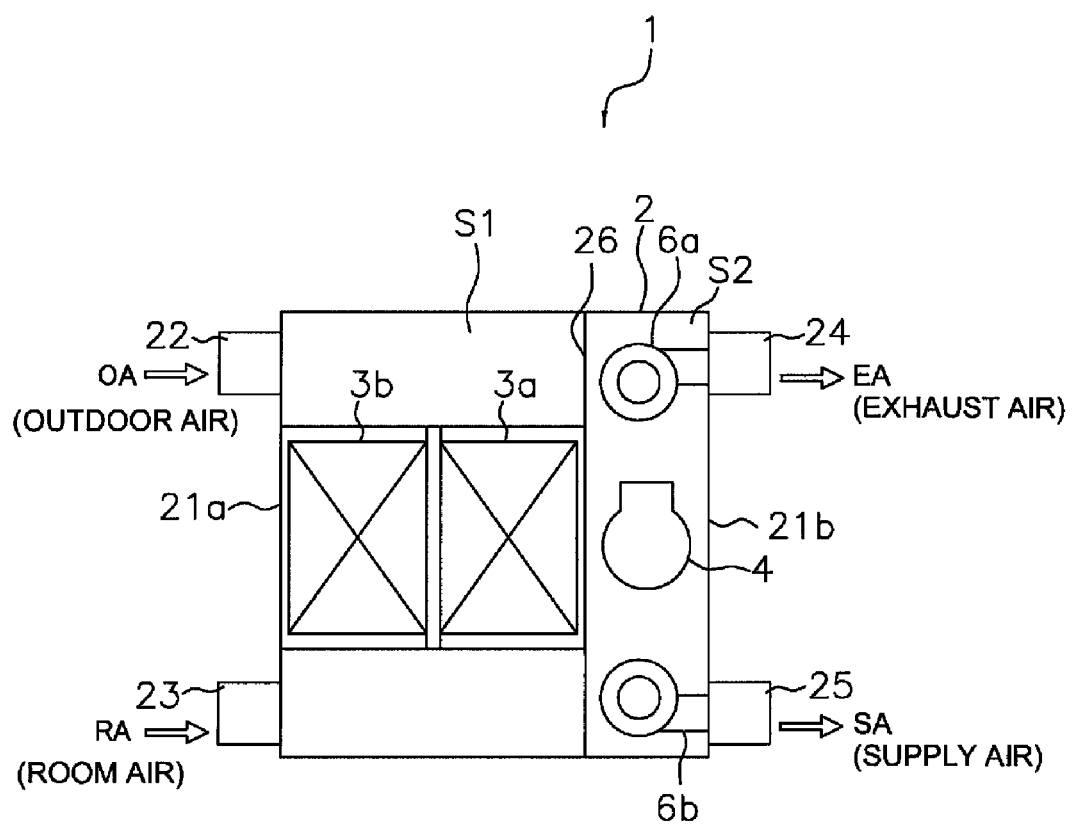
FIG. 1 is a general plan diagram showing the configuration of an air conditioning apparatus pertaining to the present embodiment.

FIG. 1 is a general plan diagram showing the configuration of an air conditioning apparatus 1 pertaining to an embodiment of the present invention. The air conditioning apparatus 1 of FIG. 1 is a desiccant type outdoor air conditioner carrying an adsorbent such as silica gel on the surfaces of heat exchangers and performs cooling and dehumidifying operation or heating and humidifying operation with respect to air supplied to a room space.

The air conditioning apparatus 1 is, as shown in FIG. 1 to FIG. 4 and FIG. 8, mainly equipped with a casing 2, first and second heat exchangers 3a and 3b, a compressor 4, a compressor-use motor 5, first and second fans 6a and 6b, a first fan motor 7, a second fan motor device 8, a current detecting device 9 and a control unit 11. Additionally, the first heat exchanger 3a, the second heat exchanger 3b and the compressor 4 configure a refrigerant circuit shown in FIG. 2.

(1-1) Casing

The casing 2 has a substantially cuboid shape, and the first and second heat exchangers 3a and 3b, the compressor 4 and the first and second fans 6a and 6b are housed inside. In FIG. 1, in a left side surface panel 21a of the casing 2, there are formed a first suction opening 22 for sucking outdoor air OA into the inside of the casing 2 and a second suction opening 23 for sucking room air RA into the inside of the casing 2. In a right side surface panel 21b of the casing 2, there are formed a first blowout opening 24 for blowing out exhaust air EA to the outdoors and a second blowout opening 25 for supplying air SA after humidity conditioning to the room. A duct that extends into the room is connected to the second blowout opening 25, and the air SA after being humidity-conditioned is supplied to the room through this duct.

Further, inside the casing 2, there is disposed a partition panel 26 that partitions the inside of the casing 2. Because of this partition panel 26, the inside of the casing 2 is divided into an air chamber S1 and a machine chamber S2. In the air chamber S1, there are placed the first and second heat exchangers 3a and 3b and partition members of each of the heat exchangers 3a and 3b, and in the machine chamber S2, there are placed other devices (specifically, such as the compressor 4 and the first and second fans 6a and 6b) excluding the first and second heat exchangers 3a and 3b.

(1-2) Heat Exchangers

Figure 3:
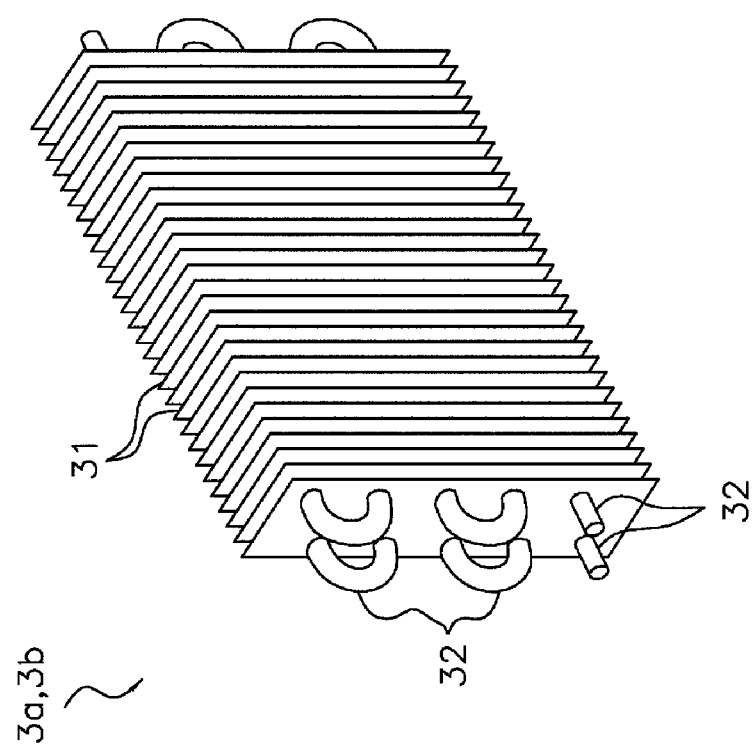
FIG. 3 is a perspective diagram of first and second heat exchangers with which the air conditioning apparatus is equipped.

The first heat exchanger 3a and the second heat exchanger 3b are, as shown in FIG. 3, cross-fin type fin-and-tube heat exchangers and are equipped with numerous fins 31 that are made of aluminium and formed in substantially rectangular panel shapes and heat transfer tubes 32 that are made of copper and penetrate these fins 31. An adsorbent that adsorbs moisture included in the air passing through each of the heat exchangers 3a and 3b is carried by dip molding (dip forming) or the like on the outer surfaces of each of the fins 31 and heat transfer tubes 32. Here, as the adsorbent, there can be used zeolite, silica gel, activated carbon, a functional polymer material such as a hydrophilic or water-absorbing organic polymer material, an ion-exchange resin material having a carboxylic acid group or a sulfonic acid group, and a temperature-sensitive polymer, etc.

Figure 2:
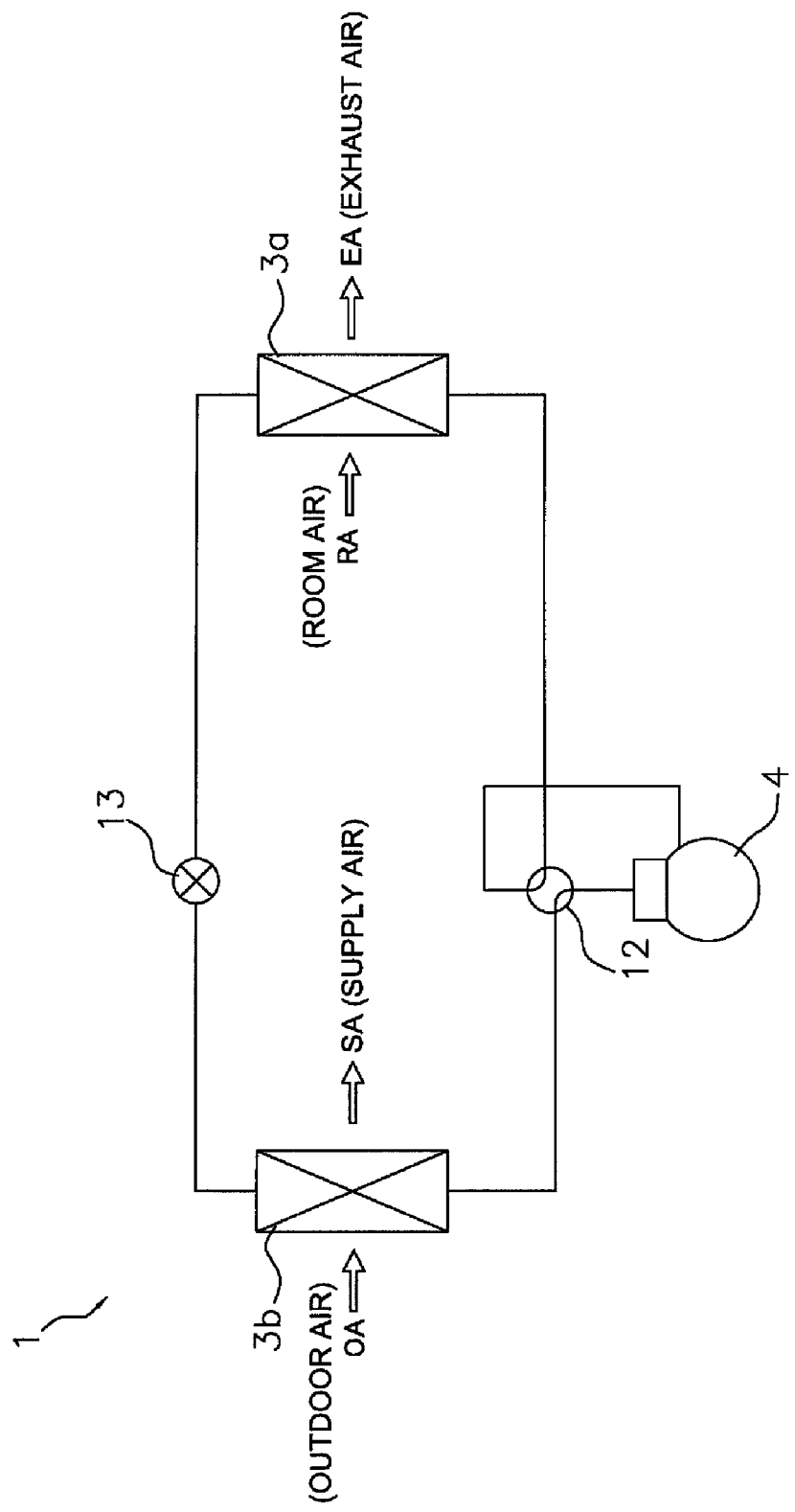
FIG. 2 is a refrigerant circuit diagram of the air conditioning apparatus pertaining to the present embodiment.

The first and second heat exchangers 3a and 3b are, as shown in FIG. 2, connected to each other via an expansion valve 13. For example, the first heat exchanger 3a performs heat exchange with the room air RA that has been sucked in from the second suction opening 23, and the second heat exchanger 3b performs heat exchange with the outdoor air OA that has been sucked in from the first suction opening 22. The room air RA after heat exchange is exhausted to the outdoors as the exhaust air EA, and the outdoor air OA after heat exchange is supplied to the room as the air SA after humidity conditioning.

The first and second heat exchangers 3a and 3b are controlled by a control unit 11 such that they can take either a first state where the first heat exchanger 3a functions as a condenser and the second heat exchanger 3b functions as an evaporator or a second state where the first heat exchanger 3a functions as an evaporator and the second heat exchanger 3b functions as a condenser. In the first state, there are performed regenerative operation of the adsorbent that causes the moisture to be desorbed from the adsorbent when the first heat exchanger 3a functions as a condenser and adsorption operation that causes the moisture to be adsorbed in the adsorbent when the second heat exchanger 3b functions as an evaporator. Further, in the second state, there are performed adsorption operation that causes the moisture to be adsorbed in the adsorbent when the first heat exchanger 3a functions as an evaporator and regenerative operation of the adsorbent that causes the moisture to be desorbed from the adsorbent when the second heat exchanger 3b functions as a condenser. In this manner, adsorption operation and regenerative operation are alternately performed and the flow paths of the air EA and SA supplied to the outdoors and to the room through each of the heat exchangers 3a and 3b switch, whereby adsorption and release (that is, desorption) of the moisture in the adsorbent can be continuously performed. Consequently, the air conditioning apparatus 1 can perform various types of operation while maintaining dehumidification performance or humidification performance.

Here, switching of the flow paths of the air EA and SA supplied to the outdoors and to the room through each of the heat exchangers 3a and 3b is performed by an unillustrated switching damper. The switching damper switches the flow paths of the air such that the outdoor air OA and the room air RA are blown out from the first blowout opening 24 or the second blowout opening 25 after passing through either of the first heat exchanger 3a or the second heat exchanger 3b.

(1-3) Compressor and Compressor-Use Motor

The compressor 4 is, as shown in FIG. 2, connected to the first heat exchanger 3a and the second heat exchanger 3b via a four-way valve 12. The compressor 4 compresses refrigerant from the first heat exchanger 3a or the second heat exchanger 3b functioning as an evaporator. The compressor 4 that performs compression operation is driven by the compressor-use motor 5.

The compressor-use motor 5 is connected to the compressor 4. The compressor-use motor 5 is a brushless DC motor, for example, and is driven to rotate by a driver 51 (FIG. 8) for the compressor-use motor 5.

(1-4) Fans and Fan Motors

The first fan 6a is, as shown in FIG. 1, disposed in a position corresponding to the first blowout opening 24 and sends the exhaust air EA to the outside of the casing 2 (specifically, the outdoors) via the first blowout opening 24. The second fan 6b is disposed in a position corresponding to the second blowout opening 25 and sends the air SA after humidity conditioning to the outside of the casing 2 (specifically, into the room) via the second blowout opening 25. The first fan 6a is driven to rotate by the first fan motor 7 (FIG. 8), and the second fan 6b is driven to rotate by the second fan motor device 8.

Figure 4:
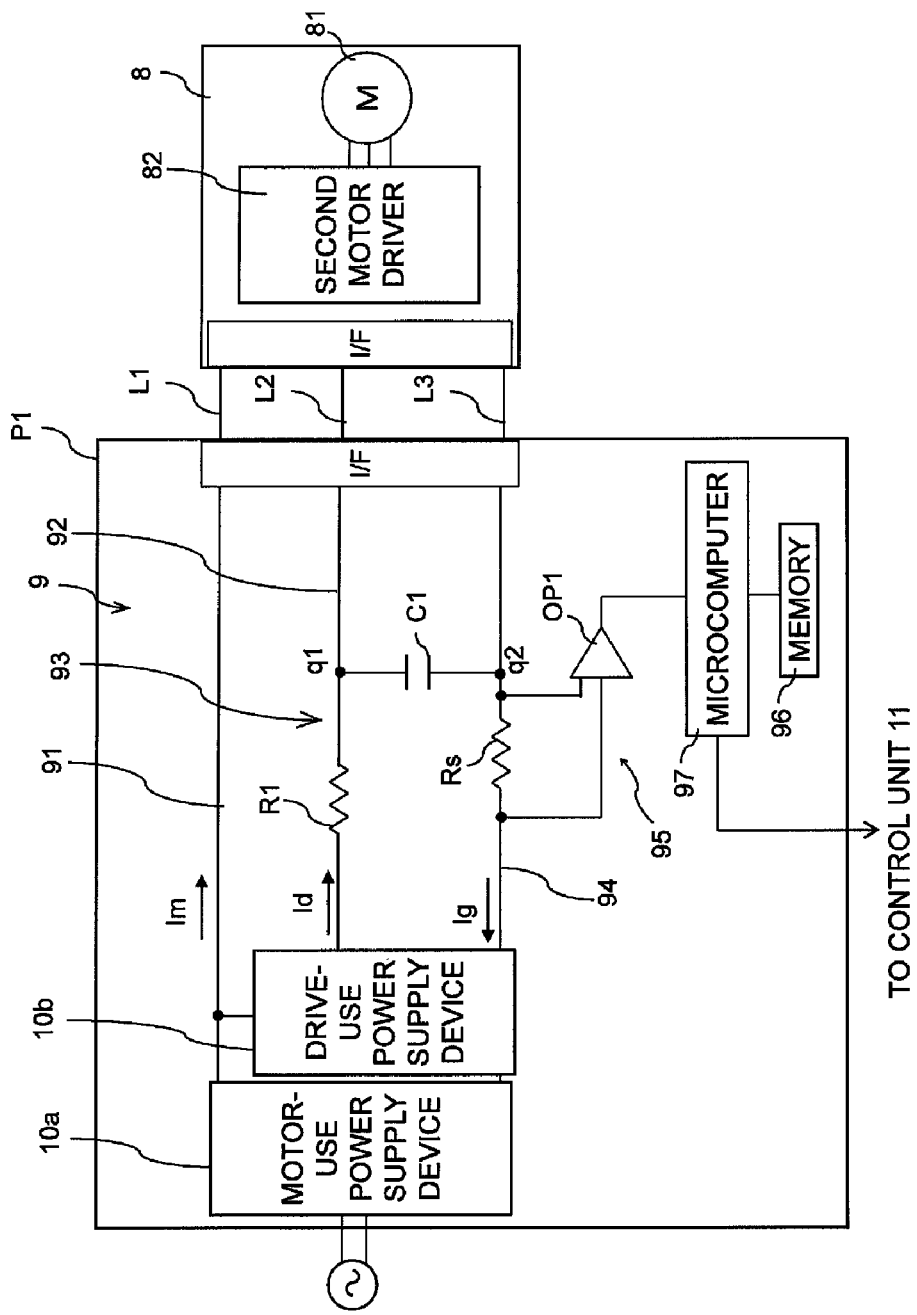
FIG. 4 is a diagram showing the circuit configuration inside a printed board on which a current detecting device pertaining to the present embodiment is mounted and the general configuration of a second fan motor device connected to this printed board.
Figure 8:
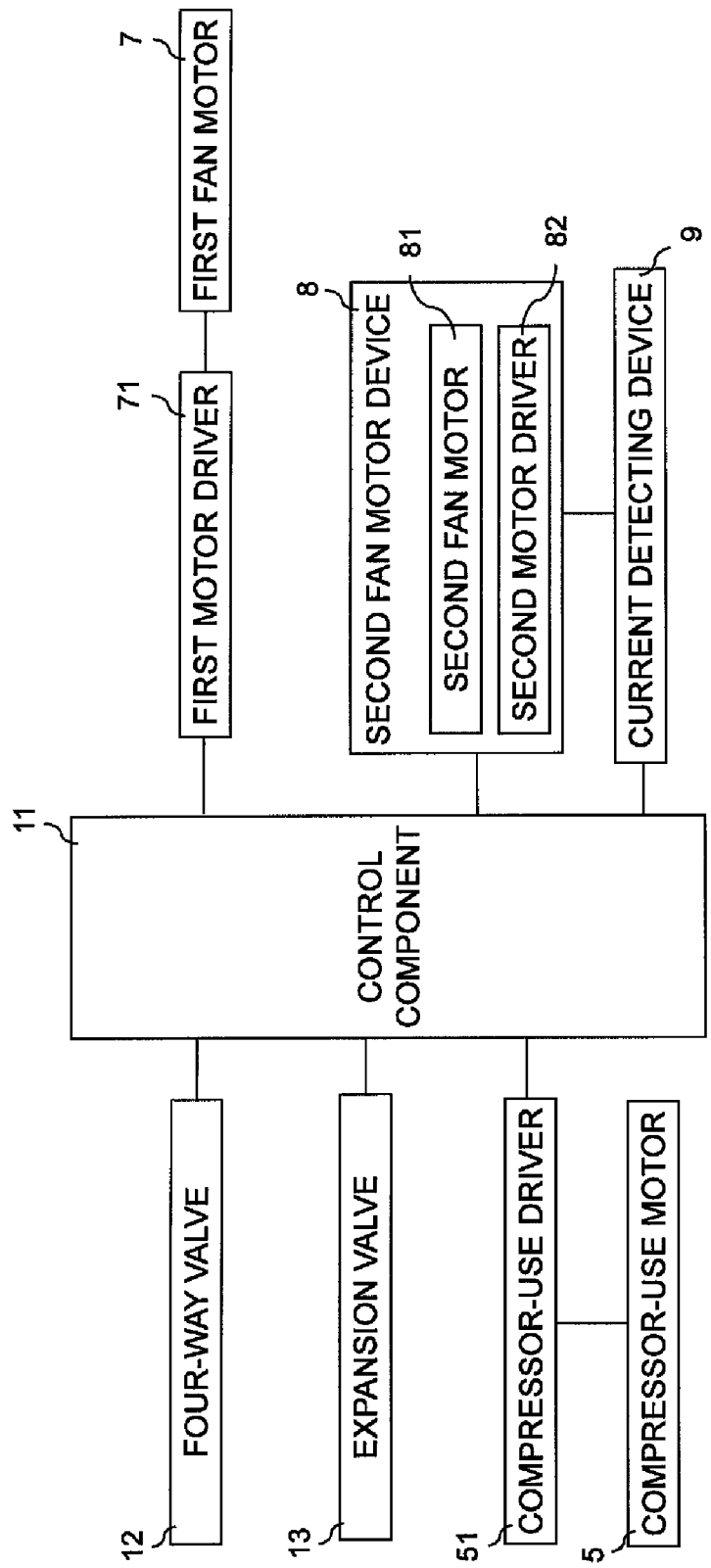
FIG. 8 is a block diagram schematically showing the configuration of the air conditioning apparatus pertaining to the present embodiment.

The first fan motor 7 is connected to the first fan 6a. The first fan motor 7 is, like the compressor-use motor 5, a brushless DC motor, for example, and is controlled to rotate by a first motor driver 71 for the first fan motor 7. The second fan motor device 8 is connected to the second fan 6b and, as shown in FIG. 4 and FIG. 8, is a device including a second fan motor 81 and a second motor driver (which corresponds to a motor drive unit) 82. The second fan motor 81 is a brushless DC motor, for example, and specifically has a rotor comprising a permanent magnet having plural magnetic poles and a stator having a drive coil. The second motor driver 82 is for driving the second fan motor 81 to rotate and includes a switching element for passing a current through the drive coil of the second fan motor 81. The second motor driver 82 having this configuration outputs to the second fan motor 81 a drive voltage corresponding to the position of the rotor with respect to the stator.

(1-5) Current Detecting Device

The current detecting device 9 is for detecting a GND current Ig (described later) including a motor current Im passed through the second fan motor 81 and, as shown in FIG. 4, is mounted on a printed board P1 together with a motor-use power supply device 10a that generates power for supply to the second fan motor 81 (hereinafter called "motor-use power") and a drive-use power supply device 10b that generates power for supply to the second motor driver 82 (hereinafter called "drive-use power"). Here, examples of types of the motor-use power supply device 10a and the drive-use power supply device 10b include a dropper power supply and a switching power supply. Further, the printed board P1 and the second fan motor device 8 are connected to each other by three harnesses L1, L2 and L3 between an interface of the printed board P1 and an interface of the second fan motor device 8. Two harnesses L1 and L2 of these three harnesses L1 to L3 are harnesses for the power outputted from each of the power supply devices 10a and 10b, and the remaining one harness L3 is a harness for a GND of the second fan motor device 8.

The configuration of the current detecting device 9 pertaining to the present embodiment will be described below mainly using FIG. 4. The current detecting device 9 is equipped with a motor-use power supply wire 91 (which corresponds to a third wire), a drive-use power supply wire 92 (which corresponds to a second wire), a current leveling unit 93, a GND wire (which corresponds to a first wire) 94, a current detecting unit 95, a memory 96 (which corresponds to a storage unit) and a microcomputer 97 (which corresponds to a motor current calculating unit).

<Motor-Use Power Supply Wire>

The motor-use power supply wire 91 is a wire that interconnects an output of the motor-use power supply device 10a and the interface of the printed board P1, and the motor-use power outputted from the motor-use power supply device 10a is applied thereto. Additionally, the motor-use power supply wire 91 is connected to the harness L1, so the motor-use power is applied to the second fan motor 81 of the second fan motor device 8 via the harness L1. Consequently, a motor current Im passed through the second fan motor 81 flows on the motor-use power supply wire 91.

The motor current Im flows on the motor-use power supply wire 91 only when the second fan motor 81 is rotating.

<Drive-use Power Supply Wire>

The drive-use power supply wire 92 is a wire that interconnects an output of the drive-use power supply device 10b and the interface of the printed board P1, and the drive-use power outputted from the drive-use power supply device 10b is applied thereto. Additionally, the drive-use power supply wire 92 is connected to the harness L2, so the drive-use power is applied to the second motor driver 82 of the second fan motor device 8 via the harness L2. Consequently, a drive current Id passed through the second motor driver 82 flows on the drive-use power supply wire 92.

The drive current Id flows on the drive-use power supply wire 92 not just when the second fan motor 81 is rotating but also when the second fan motor 81 is not rotating. Here, when the second fan motor 81 is not rotating refers to a state where the second fan motor 81 is not started and the speed thereof is substantially 0 rpm (that is, a rotation stopped state).

<Current Leveling Unit>

The current leveling unit 93 is for leveling the drive current Id flowing on the drive-use power supply wire 92 and is configured by a filter circuit comprising a resistor R1 and a capacitor C1. The resistor R1 is connected in series on the drive-use power supply wire 92, and the capacitor C1 is connected to the drive-use power supply wire 92 in parallel with respect to the resistor R1. More specifically, one end q1 of the capacitor C1 is connected to the drive-use power supply wire 92 on a drive current Id downstream side of the resistor R1, and another end q2 is connected to the GND wire 94.

Figure 5:
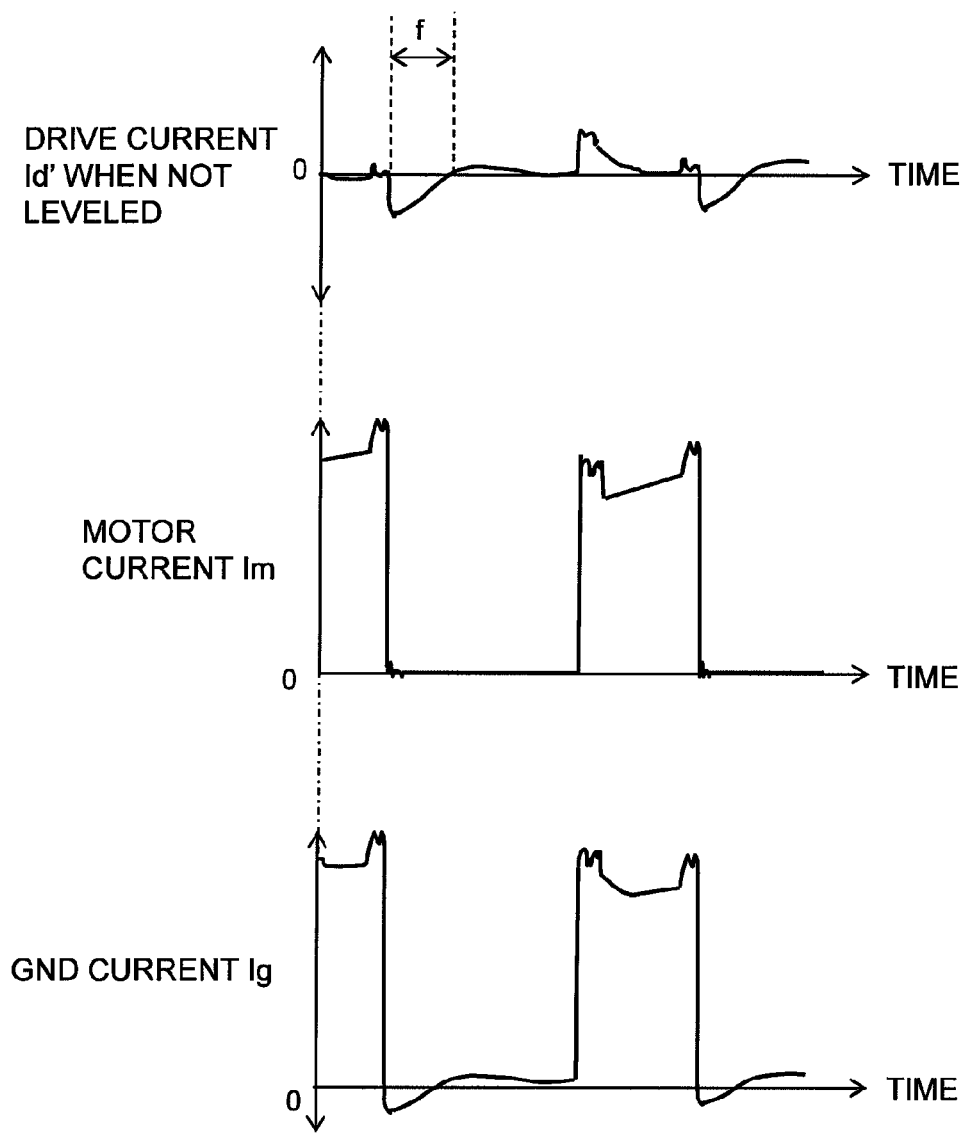
FIG. 5 is a graph showing temporal changes in a drive current Id', a motor current Im and a GND current Ig when a current leveling unit is not disposed.
Figure 6:
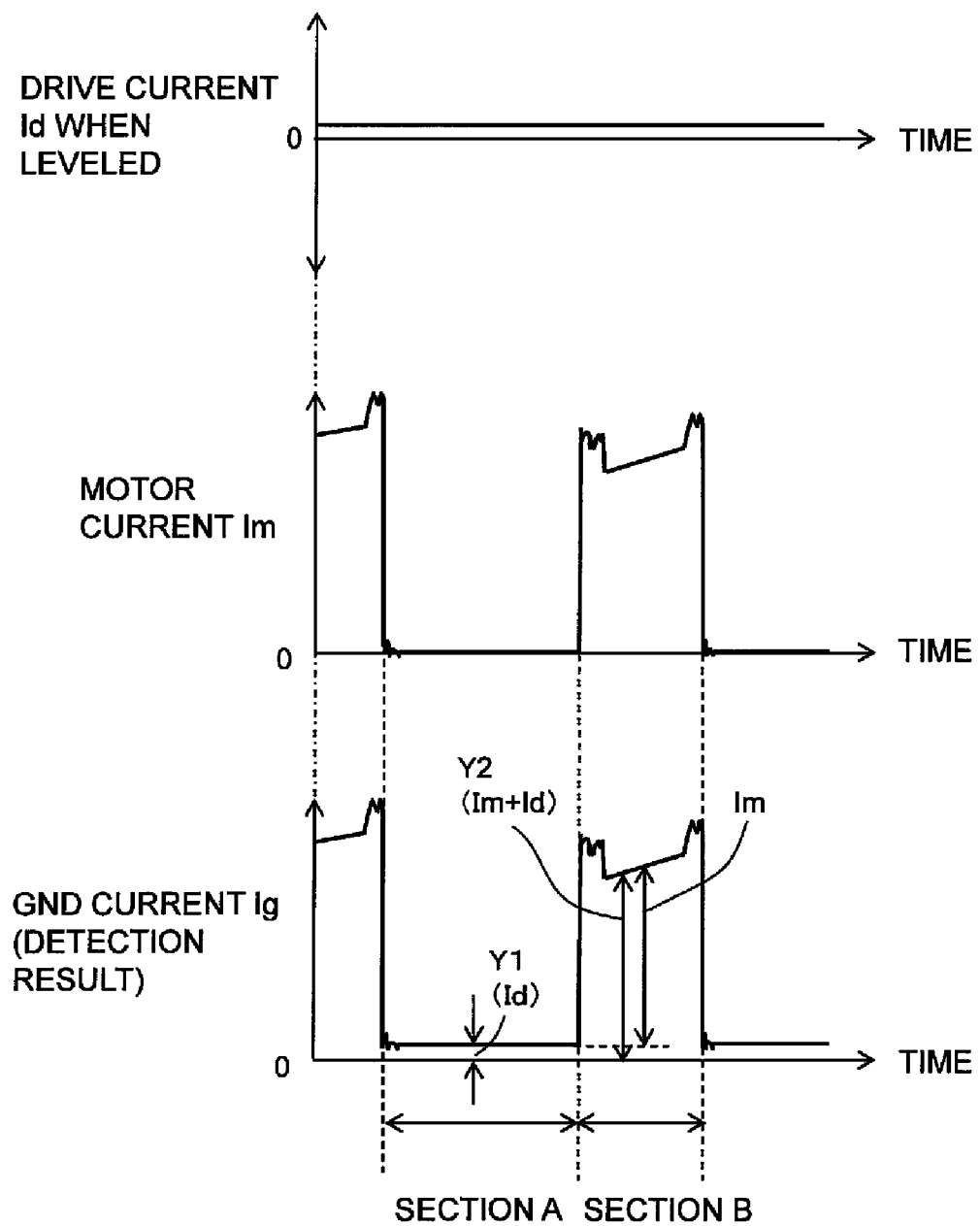
FIG. 6 is a graph showing temporal changes in the drive current Id, the motor current Im and the GND current Ig when the drive current has been leveled using a current leveling unit of the current detecting device pertaining to the present embodiment.

Here, the resistance value of the resistor R1 and the capacitance value of the capacitor C1 are decided as follows, for example. First, in a drive current Id' when the current leveling unit 93 is not disposed, the drive current Id' particularly changes, so a frequency f of the portion that should be leveled is measured (FIG. 5). Then, the resistance value of the resistor R1 and the capacitance value of the capacitor C1 are determined such that this frequency f becomes substantially equal to a time constant of the resistor R1 and the capacitor C1. Because of the filter circuit configured by the resistor R1 and the capacitor C1 decided in this manner, the drive current Id' is leveled as shown in FIG. 6.

<GND Wire>

The GND wire 94 is a wire that interconnects a GND of each of the power supply devices 10a and 10b and the interface of the printed board P1 and is connected to the GND of the second fan motor device 8 via the harness L3. Consequently, a current in which the motor current Im and the leveled drive current Id are added together flows on the GND wire 94. For convenience of description, the current flowing on the GND wire 94 will be called a GND current Ig below.

Figure 7:
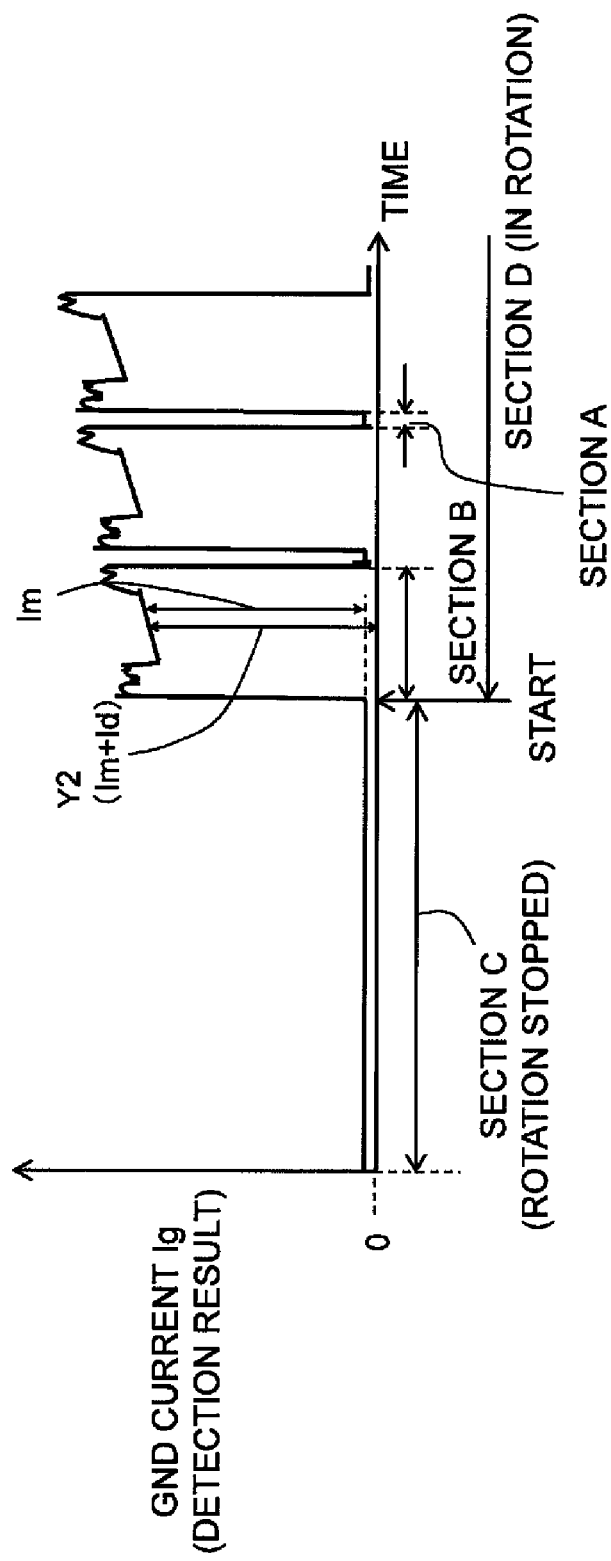
FIG. 7 is a graph showing temporal changes in the GND current Ig when a second fan motor pertaining to the present embodiment has started rotating from a state where it has stopped rotating.

As mentioned already, the motor current Im flows on the motor-use power supply wire 91 only when the second fan motor 81 is rotating, and the drive current Id flows on the drive-use power supply wire 92 regardless of whether or not the second fan motor 81 is rotating. Consequently, as shown in FIG. 7, when the second fan motor 81 is rotating, the motor current Im and the drive current Id after being passed through the second fan motor 81 and the second motor driver 82, respectively, flow on the GND wire 94 (section D of FIG. 7; particularly section B). When the second fan motor 81 is not rotating, the motor current Im is not passed through the second fan motor 81 but the drive current Id is passed through the second motor driver 82, so only the drive current Id flows on the GND wire 94 (section C of FIG. 7).

<Current Detecting Unit>

The current detecting unit 95 detects the GND current Ig flowing on the GND wire 94. More specifically, when the second fan motor 81 is rotating, the current detecting unit 95 mainly detects the sum of the motor current Im and the leveled drive current Id (section D of FIG. 7; particularly section B), and when the second fan motor 81 is not rotating, the current detecting unit 95 detects only the leveled drive current Id (section C of FIG. 7).

The current detecting unit 95 is mainly configured by such as a shunt resistor Rs and an op-amp OP1. The shunt resistor Rs is connected in series to the GND wire 94. More specifically, the shunt resistor Rs is connected to the GND wire 94 on the GND current Ig downstream side of the other end q2 of the capacitor C1 in the current leveling unit 93. Two input terminals of the op-amp OP1 are connected to both end portions of the shunt resistor Rs, and an output terminal is connected to the microcomputer 97. When the op-amp OP1 amplifies both end voltages of the shunt resistor Rs by a predetermined gain, the op-amp OP1 outputs this to the microcomputer 97.

<Memory>

The memory 96 is configured by a nonvolatile memory such as a flash memory or an EEPROM and can store a correction constant Ht for correcting the detection result (that is, the GND current Ig) of the current detecting unit 95. The memory 96 pertaining to the present embodiment stores the correction constant Ht before the current detecting device 9 is shipped. In other words, the correction constant Ht pertaining to the present embodiment is used when the motor current Im is determined from the result (that is, the sum of the motor current Im and the leveled drive current Id) that the current detecting unit 95 has detected when the second fan motor 81 is rotating when the current detecting device 9 has been shipped and is being used for detecting the current of the second fan motor 81 in the state shown in FIG. 4.

<Microcomputer>

The microcomputer 97 is configured by a CPU, a ROM that stores various types of programs for the CPU to read and execute, and a RAM that functions as a work memory when the CPU executes the programs. When the current detecting device 9 is being used for detecting the current of the second fan motor 81 as shown in FIG. 4, the microcomputer 97 reads the detection result of the current detecting unit 95, samples this at a predetermined time, and A/D-converts this. Then, the microcomputer 97 performs calculation of the motor current Im flowing on the motor-use power supply wire 91 on the basis of the correction constant Ht stored in the memory 96 and the A/D-converted detection result of the current detecting unit 95.

Here, examples of methods of judging the motor current Im from the GND current Ig include the following method. It will be assumed that the correction constant Ht represents the actual motor current Im with respect to the motor current Im including variation in the second fan motor 81. When the drive current Id is leveled, the value thereof becomes close to 0 A. Then, as shown in FIG. 6 and FIG. 7, in the GND current Ig including the leveled drive current Id, there arises a section where the value thereof becomes close to 0 A (section A of the GND current Ig in FIG. 6 and FIG. 7). This is because whereas the motor current Im is passed through the second fan motor 81 periodically, the leveled drive current Id is holding a substantially constant state (that is, a state where it is close to 0 A). For that reason, in the GND current Ig, there arises a section where only the drive current Id is included, like in section A. Thus, the microcomputer 97 decides, as the drive current Id, a result Y1 (that is, the GND current Ig) that the current detecting unit 95 has detected in the section where the GND current Ig on the GND wire 94 is holding a value close to 0 A, like in section A (Y1=Id). Next, the microcomputer 97 subtracts the drive current 95 (that is, the detection result Y1) from the value of a result Y2 (that is, the GND current Ig) that the current detecting unit Id has detected in the section where the sum of the motor current Im and the leveled drive current Id is flowing on the GND wire 94, like in section B of FIG. 6 and FIG. 7, and multiplies the subtracted result by the correction constant Ht to calculate the motor current Im (Im=(Y2−Y1)×Ht).

In this manner, by using the correction constant Ht stored inside the memory 96 and the detection result of the current detecting unit 95 to calculate the motor current Im, the microcomputer 97 can determine an accurate motor current Im.

(1-6) Control Unit

The control unit 11 is a microcomputer configured by memories such as a RAM and a ROM and by a CPU and is disposed separately from the microcomputer 97 of the current detecting device 9. The control unit 11 is, as shown in FIG. 8, connected to the four-way valve 12, the expansion valve 13, the compressor-use driver 51 and the first motor driver 71 and performs control of the various devices to which it is connected. For example, the control unit 11 performs pathway switching control of the four-way valve 12 and drive control of the compressor-use driver 51 and the first motor driver 71.

In particular, the control unit 11 pertaining to the present embodiment is also connected to the second fan motor device 8 and the current detecting device 9. The control unit 11 performs control of the volume of air sent into the room from the second fan 6b by performing speed control of the second motor driver 82 on the basis of the motor current Im that has been calculated by the microcomputer 97 of the current detecting device 9. Examples of the content of air volume control include air volume control such that the volume of air sent into the room becomes constant. In the present embodiment, as mentioned already, an accurate motor current Im is determined, so the control unit 11 can hold at a substantial constant the air volume, which is easily susceptible to affects such as air pressure that changes depending on the length of the duct extending into the room from the second blowout opening 25 and the breadth of the room.

(2) Configuration of Correction Constant Calculating System

Figure 9:
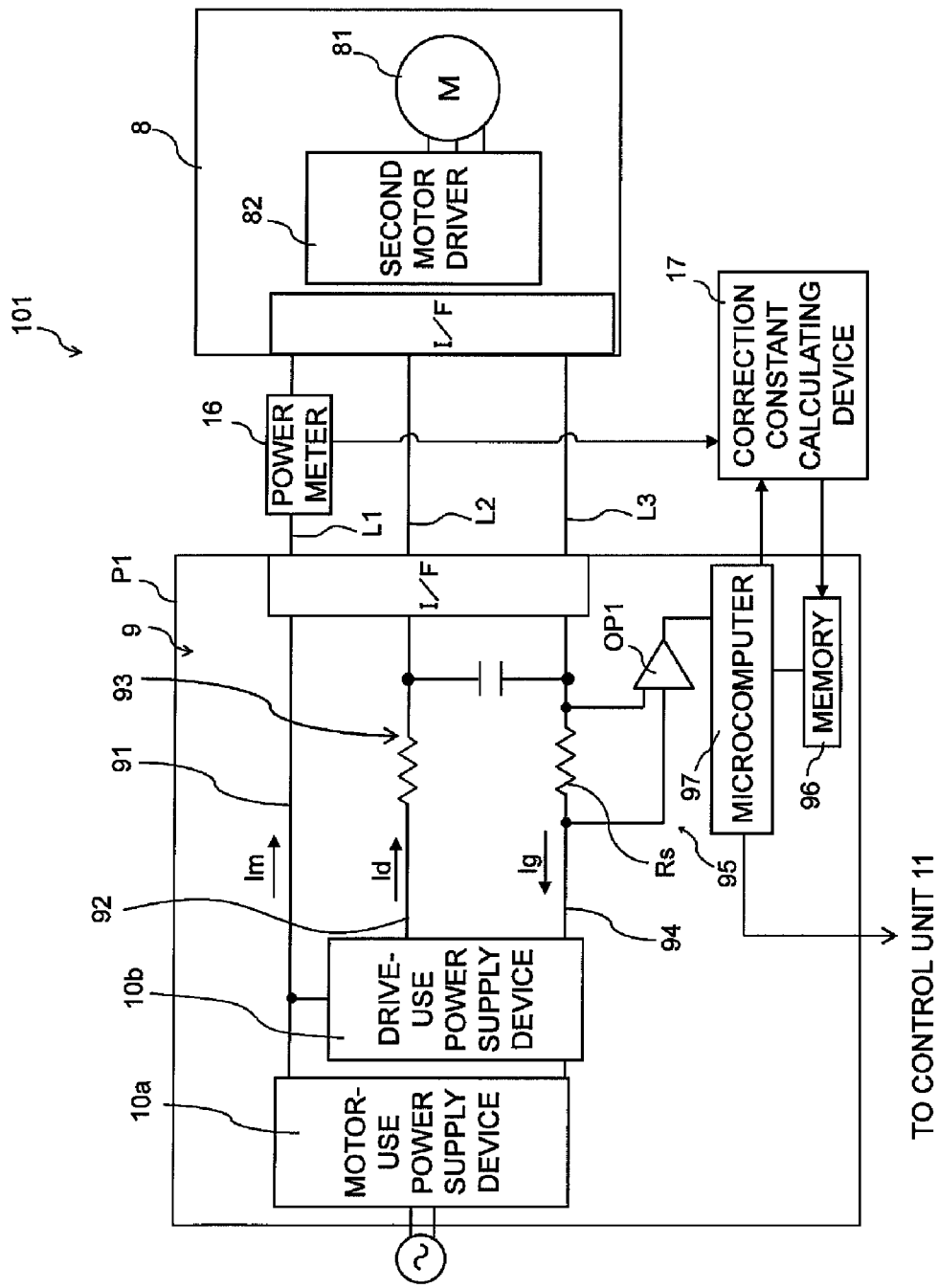
FIG. 9 is a diagram showing the configuration of a correction constant calculating system pertaining to the present embodiment.

Next, how the correction constant Ht stored in the memory 96 of the current detecting device 9 is calculated will be described. FIG. 9 is a configuration diagram of a correction constant calculating system 101 pertaining to the present embodiment. The correction constant calculating system 101 is used to determine the correction constant Ht at the time of the production line of the current detecting device 9—that is, before the current detecting device 9 is completed and shipped. The correction constant calculating system 101 is, as shown in FIG. 9, equipped with the current detecting device 9, which is connected via the harnesses L1 to L3 to the second fan motor device 8, a power meter 16, and a correction constant calculating device 17 (which corresponds to a correction constant calculating unit). The current detecting device 9 has already been described, so the configurations of the power meter 16 and the correction constant calculating device 17 will be described specifically below.

(2-1) Power Meter

The power meter 16 is connected on the harness L1, which is in a state where it is connected to the motor-use power supply wire 91 when calculation of the correction constant Ht is performed (that is, before shipment of the current detecting device 9; on the production line), and measures the motor current Im flowing on the motor-use power supply wire 91. The power meter 16 is also connected to the correction constant calculating device 17 and outputs the measurement result it has measured to the correction constant calculating device 17.

When the current detecting device 9 is shipped after the correction constant Ht that has been calculated by the correction constant calculating system 101 has been stored in the memory 96 of the current detecting device 9, the power meter 16 is removed from the motor-use power supply wire 91 as shown in FIG. 4.

(2-2) Correction Constant Calculating Device

The correction constant calculating device 17 is, as shown in FIG. 9, connected to the current detecting device 9 before shipment and to the power meter 16. The correction constant calculating device 17 performs calculation of the correction constant Ht and writes the correction constant Ht it has calculated in the memory 96 of the current detecting device 9. That is, the correction constant calculating device 17 performs the operation of calculating the correction constant Ht and the operation of writing the correction constant Ht in the memory 96 before shipment of the current detecting device 9. The correction constant calculating device 17 is configured by a microcomputer separate from the microcomputer 97 of the current detecting device 9 and by an interface.

A method by which the correction constant calculating device 17 calculates the correction constant Ht will be described in detail below. The correction constant calculating device 17 pertaining to the present embodiment calculates the correction constant Ht on the basis of (a) to (c) below:

(a) a detection result DIon of the current detecting unit 95 at a time when the second fan motor 81 is rotating;

(b) a measurement result MIon of the power meter 16 at a time when the second fan motor 81 is rotating; and (c) a detection result DIoff of the current detecting unit 95 at a time when the second fan motor 81 is not rotating.

Additionally, the correction constant detecting device 17 calculates the correction constant Ht by applying (a) to (c) to expression (1) below.

$$Ht=MIon/(DIon-DIoff) \quad (1)$$

As the detection result DIon of the current detecting unit 95 at a time when the second fan motor 81 is rotating, the sum of the motor current Im and the leveled drive current Id applies. As the detection result DIoff at a time when the second fan motor 81 is not rotating, only the leveled drive current Id applies. Additionally, hardware variations such as the value of the shunt resistor Rs and the gain of the op-amp OP1 are included in both of these detection results DIon and DIoff. Moreover, at a time when the second fan motor 81 is rotating, the motor current Im is passed through the second fan motor 81, so variation in the second fan motor 81 is also included in the motor current Im in the detection result DIon of the current detecting unit 95. The power meter 16 measures the current flowing on the motor-use power supply wire 91, so as the measurement result MIon of the power meter 16, only an accurate motor current Im in which various types of variations are not included applies. Consequently, according to expression (1) above, the drive current Id included in both of the detection results DIon and DIoff of the current detecting unit 95 is offset by the right-hand denominator "(DIon−DIoff)", but the motor current Im including variation in the second fan motor 81 included in the detection result DIon remains. Consequently, it will be understood that the correction constant Ht that has been obtained by expression (1) above represents the ratio between the motor current Im including variation in the second fan motor 81 that has been detected by the current detecting unit 95 and the actual motor current Im.

In expression (1) above, the measurement result of the power meter 16 at a time when the second fan motor 81 is not rotating is not included. This is because at a time when the second fan motor 81 is not rotating, the motor current Im does not flow on the motor-use power supply wire 91. In other words, the motor current Im is not passed through the second fan motor 81. For that reason, even if the power meter 16 were to perform measurement, the measurement result would be substantially 0 A. Consequently, the correction constant calculating device 17 does not have to use the measurement result of the power meter 16 at a time when the second fan motor 81 is not rotating to calculate the correction constant Ht.

After the operation of calculating and the operation of writing the correction constant Ht end, the correction constant calculating device 17 is, like the power meter 16, removed from the current detecting device 9 as shown in FIG. 4.

(3) Flow of Correction Constant Calculating Method

Figure 10:
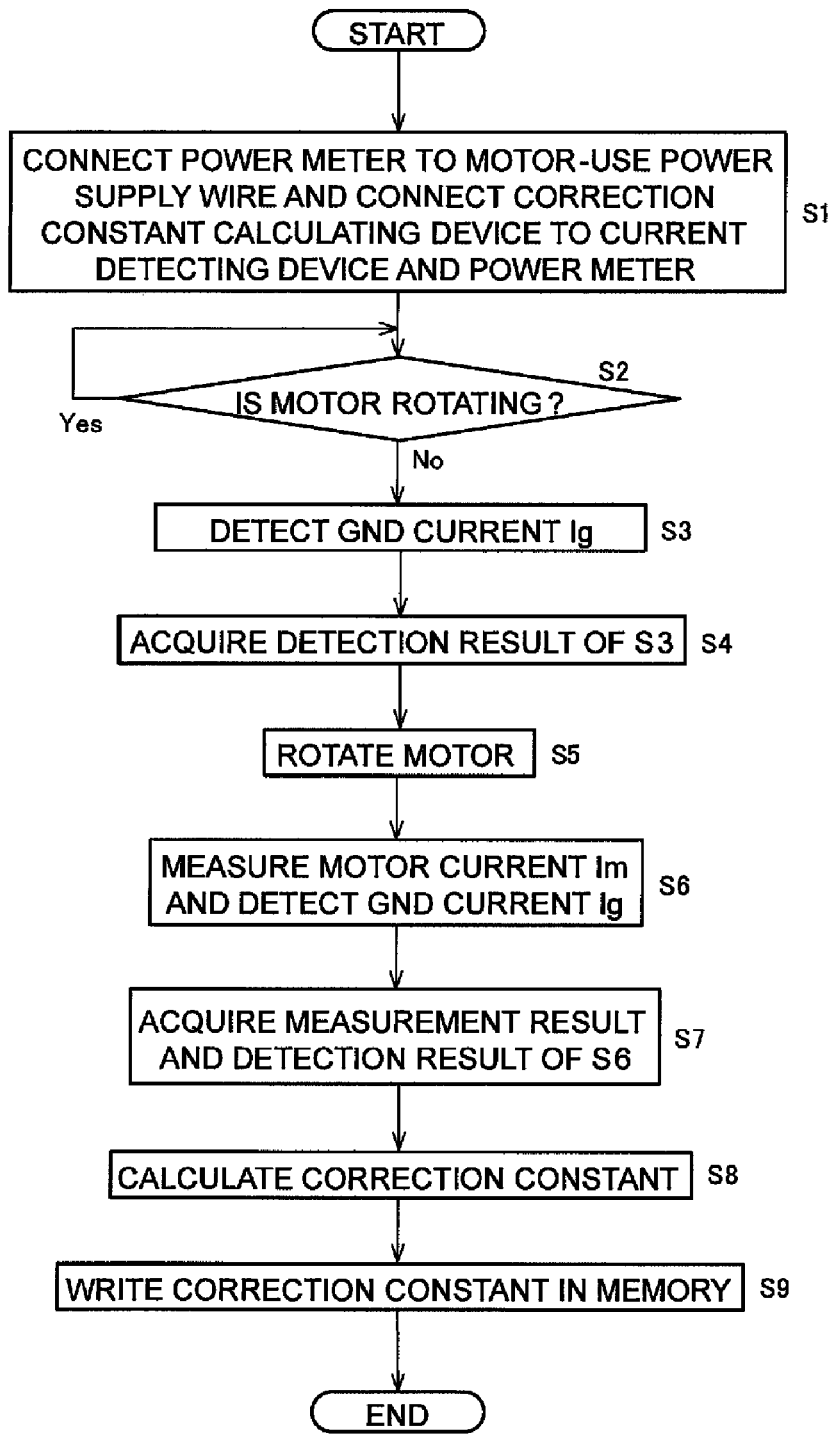
FIG. 10 is a flowchart for describing a flow of a correction constant calculating method pertaining to the present embodiment.

Next, an overall flow of a correction constant calculating method resulting from the correction constant calculating system 101 will be described using FIG. 10. The operation below is performed in a state where the current detecting device 9 before shipment of the current detecting device 9 and specifically after the current detecting device 9 has been assembled on a production line is connected to the second fan motor device 8. Further, the operation of connecting the power meter 16 and the correction constant calculating device 17 is performed by a user of the correction constant calculating system 101.

Step 1: First, the power meter 16 is connected on the harness L1 connected to the motor-use power supply wire 91 of the current detecting device 9, and the correction constant calculating device 17 is connected to the current detecting device 9 and the power meter 16.

Step 2: The microcomputer 97 of the current detecting device 9 judges whether or not the second fan motor 81 is rotating on the basis of the detection result (that is, the GND current Ig) of the current detecting unit 95. When the second fan motor 81 is rotating (YES in S2), the microcomputer 97 notifies the control unit 11 of the air conditioning apparatus 1 to stop the rotation of the second fan motor 81 and stands by until the rotation of the second fan motor 81 stops.

Steps S3 to S5: In step S2, when the second fan motor 81 is not rotating (NO in S2), the current detecting unit 95 redetects the GND current Ig on the GND wire 94 (S3), and the microcomputer 97 imports the detection result DIoff of the current detecting unit 95 in step S3 and A/D-converts this. Then, the correction constant calculating device 17 acquires from the microcomputer 97 the detection result DIoff after A/D conversion (S4). After the microcomputer 97 outputs to the correction constant calculating device 17 the detection result DIoff after A/D conversion, the microcomputer 97 notifies the control unit 11 to rotate the second fan motor 81 (S5).

Step S6: When the second fan motor 81 rotates, the current detecting unit 95 of the current detecting device 9 redetects the GND current Ig on the GND wire 94, and the power meter 16 measures the motor current Im on the harness L1 (S6; S1 and S6 correspond to a measuring step).

Step 7: The microcomputer 97 imports the detection result DIon of the current detecting unit 95 of step S6 and A/D-converts this. Then, the correction constant calculating device 17 acquires from the microcomputer 97 the detection result DIon after A/D conversion and directly acquires from the power meter 16 the measurement result MIon. After the microcomputer 97 outputs the detection result DIon after A/D conversion, the microcomputer 97 notifies the control unit 11 to stop the rotation of the second fan motor 81.

Step S8: The correction constant calculating device 17 uses the detection result DIoff acquired in step S4 and the detection result DIon and measurement result MIon acquired in step S7 to calculate the correction constant Ht (which corresponds to a calculating step).

Step S9: The correction constant calculating device 17 writes the correction constant Ht calculated in step S8 in the memory 96 of the current detecting device 9 (which corresponds to a writing step).

The current detecting device 9 in whose memory 96 the correction constant Ht has been written in this manner is disconnected from the correction constant calculating device 17 and the power meter 16 and is shipped in a state where it is connected to the second fan motor device 8 as shown in FIG. 4.

(4) Advantageous Effects (A)

According to the current detecting device 9 pertaining to the present embodiment, the drive current Id included in the GND current Ig that the current detecting unit 95 detects is leveled by the current leveling unit 93. Consequently, even when the drive current Id fluctuates, an accurate motor current Im can be obtained on the basis of the sum of the motor current Im and the leveled drive current Id that has been detected by the current detecting unit 95.

(B)

In particular, the current leveling unit 93 in the current detecting device 9 can be configured by a so-called filter circuit comprising the resistor R1 and the capacitor C1. In this manner, the current detecting device 9 can level the drive current Id with the current leveling unit 93 having a simple configuration.

(C)

When the second fan motor 81 and the second motor driver 82 are built into the second fan motor device 8, in terms of the configuration of that second fan motor device 8, it is difficult to separately dispose the wire on which the motor current Im that has been passed through the second fan motor 81 flows and the wire on which the drive current Id that has been passed through the second motor driver 82 flows. However, when the current detecting device 9 pertaining to the present embodiment is applied in such a case, the drive current Id is leveled by the current leveling unit 93, so an accurate motor current Im can be obtained.

(D)

Further, the correction constant Ht for correcting the detection result of the current detecting unit 95 is stored in the memory 96 of the current detecting device 9, and the microcomputer 97 calculates the motor current Im flowing on the motor-use power supply wire 91 on the basis of the correction constant Ht and the detection result of the current detecting unit 95. Consequently, a more accurate motor current can be obtained.

(E)

Further, the current detecting device 9 can be used for detecting the current of the second fan motor 81 in the air conditioning apparatus 1. According to this air conditioning apparatus 1, the control unit 11 can use the motor current Im that has been accurately determined by the current detecting device 9 to perform control such that the volume of air sent into the room becomes constant, for example.

(F)

Incidentally, the current detecting unit 95 is, as shown in FIG. 4, configured by the shunt resistor Rs and the op-amp OP1. However, there are variations in the value of the shunt resistor Rs and in the gain of the op-amp OP1, so the detection result that has been detected by the current detecting unit 95 ends up becoming a value including these variations. Further, there are individual differences not only in the current detecting unit 95 but also in the motor itself. In particular, at the time when the motor is rotating, there is a tendency for the individual difference in the motor to become larger than the variations in each of the parts configuring the current detecting unit 95, so there is the fear that the individual difference in the motor will affect motor speed control that is performed using the motor current Im.

However, according to the correction constant calculating system 101 and the correction constant calculating method pertaining to the present embodiment, the correction constant Ht is calculated in a state where the second fan motor 8, in addition to the power meter 16 and the correction constant calculating device 17, has been connected to the current detecting device 9. Specifically, the correction constant Ht is calculated using the detection result of the current detecting unit 95 and the measurement result of the power meter 16 at a time when the second fan motor 81 is rotating. Thus, a correction constant Ht matching the actual variation in the second fan motor 81 is obtained, so it becomes possible for the current detecting device 9 to obtain a more accurate motor current using the correction constant Ht.

(G)

Further, the operation of calculating and the operation of writing the correction constant Ht are performed before shipment of the current detecting device 9. For that reason, a correction constant Ht matching the actual variation in the second fan motor 81 is already written in the memory 96 of the current detecting device 9 that has been shipped. Consequently, when the current detecting device 9 is actually used for detecting the current of the second fan motor 81, a more accurate motor current Im can be obtained using the correction constant Ht in the memory 96.

(H)

When the second fan motor 81 is not rotating (that is, at a time when the speed of the second fan motor 81 is about 0 rpm), the motor current Im becomes substantially 0 A, so the measurement result of the power meter 16 becomes substantially 0 A and the motor current Im of the detection result DIoff of the current detecting unit 95 becomes substantially 0 A. Thus, when calculating a correction constant Ht matching the actual variation in the second fan motor 81, the correction constant calculating system 101 does not use the measurement result of the power meter 16 at a time when the second fan motor 81 is not rotating but uses the detection result DIon of the current detecting unit 95 and the measurement result MIon of the power meter 16 at a time when the second fan motor 81 is rotating and the detection result DIoff of the current detecting unit 95 at a time when the second fan motor 81 is not rotating. Consequently, the parameters used to calculate the correction constant Ht can be reduced, and calculation of the correction constant Ht becomes easy.

Other Embodiments a

In the above-described embodiment, a case where the air conditioning apparatus 1 is a desiccant type outdoor air conditioner equipped with heat exchangers inside has been taken as an example and described. However, the air conditioning apparatus pertaining to the present invention can also be applied to a type of desiccant air conditioner where the heat exchangers are disposed separately from the air conditioning apparatus and to an air conditioner where a system other than a desiccant system is employed.

b

In the above-described embodiment, a case where the current leveling unit 93 of the current detecting device 9 is configured by a filter comprising the resistor R1 and the capacitor C1 has been described. However, the current leveling unit pertaining to the present invention may have any configuration as long as it can level the drive current Id before current detection is performed by the shunt resistor Rs of the current detecting unit 95.

c

In the above-described embodiment, a case where the current detecting device 9 detects the motor current Im of the second fan motor 81 in the second fan motor device 8 has been described. However, the intended use of the current detecting device pertaining to the present invention is not limited to this. The current detecting device pertaining to the present invention can also be applied to a case where, for example, the motor and the driver are not built into a motor device but are disposed separately and where a motor current-use GND wire on which the motor current flows and a drive current-use GND wire on which the drive current flows are not separately disposed but the motor current and the drive-use current both end up flowing on one GND wire.

d

In the above-described embodiment, a case where, to perform air volume control of the air SA after humidity conditioning sent into the room, the current detecting device 9 calculates the motor current Im that has passed through the second fan motor 81 and the control unit 11 of the air conditioning apparatus 1 uses the motor current Im to perform air volume control of the second fan 6b has been described. However, the target on which the current detecting device pertaining to the present invention performs current detection does not have to be the second fan motor 81. The current detecting device may also be used for detecting the current of the first fan motor 7 or the compressor-use motor 5, for example.

Further, the first fan motor 7 may also, like the second fan motor 81, be included in a fan motor device together with the first motor driver 71.

e

Figure 11:
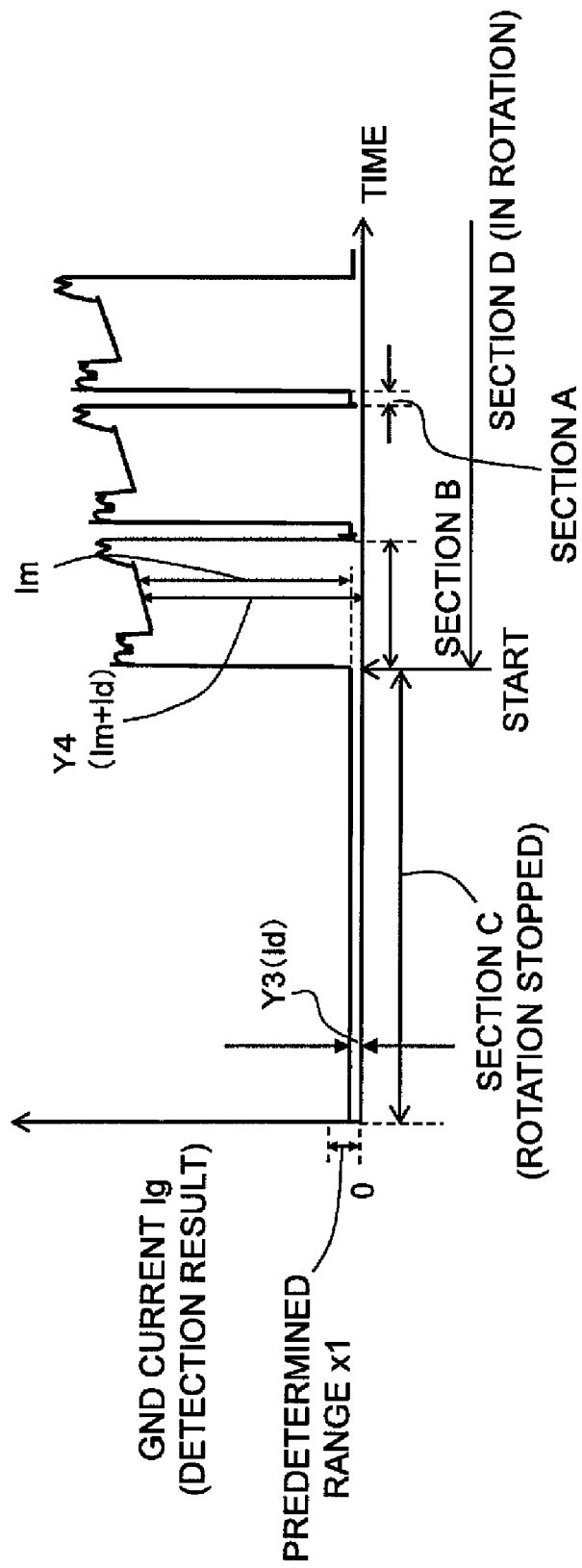
FIG. 11 is a graph showing temporal changes in the GND current Ig when the second fan motor has started rotating from a state where it has stopped rotating in another embodiment (e).

In the above-described embodiment, a case where the microcomputer 97 of the current detecting device 9 uses the GND current Ig in section A and section B in a state where the second fan motor 81 is rotating as shown in FIG. 6 and FIG. 7 to calculate the motor current Im has been described. However, the microcomputer 97 may also use the following method to calculate the motor current Im. FIG. 11 is a diagram for describing another example of a method of calculating the motor current Im.

As shown in FIG. 11, the microcomputer 97 first decides a detection result Y3 at a time when the second fan motor 81 is not rotating as the drive current Id and temporarily stores the detection result Y3 in its RAM (Y3=Id). Next, the microcomputer 97 subtracts the decided drive current Id (that is, the detection result Y3) from a detection result Y4 at a time when the second fan motor 81 is rotating and multiplies the subtracted result by the correction constant Ht to calculate the motor current Im (Im=(Y4−Y3)×Ht).

Judgment of state as to whether or not the second fan motor 81 is rotating when calculating the motor current Im is performed by the microcomputer 97 on the basis of the size of the value of the detection result (that is, the GND current Ig) of the current detecting unit 95. Specifically, when the value of the GND current Ig is close to 0 A and is within a predetermined range X1 like in section C of FIG. 11 and this state continues for an amount of time equal to or greater than a predetermined amount of time (equal to or greater than section A), the microcomputer 97 judges the state to be one where the second fan motor 81 is not rotating—that is, a rotation stopped state. The microcomputer 97 executes judgment as to whether or not the state where the value of the GND current Ig is close to 0 A continues for an amount of time equal to or greater than the predetermined amount of time so as to not erroneously judge section A (that is, the section where the motor current Im becomes substantially 0 A during rotation of the second fan motor 81), which arises as a result of the motor current Im being passed through the second fan motor 81 periodically, to be a rotation stopped state. Further, when the second fan motor 81 rotates, the value of the GND current Ig becomes larger by the amount in which the motor current Im is included. Consequently, when the value of the GND current Ig exceeds the predetermined range X1, like in section B of FIG. 11, the microcomputer 97 judges that the second fan motor 81 is rotating. Here, the predetermined range X1 and the predetermined amount of time are decided beforehand by the specifications of the second fan motor device 8 and experimentation.

Even when the above-described method is used, an accurate motor current Im can be determined.

f

Figure 12:
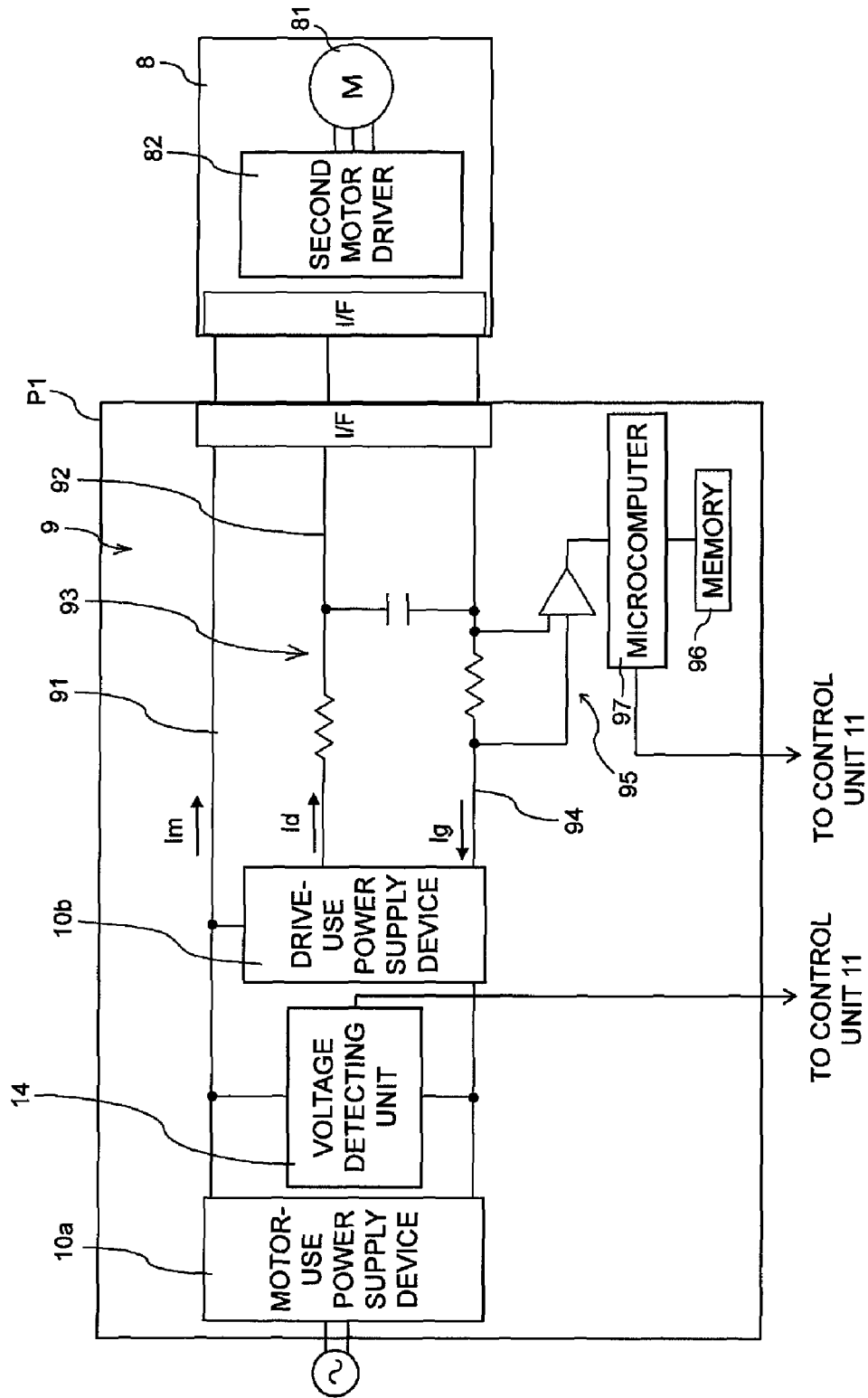
FIG. 12 is a diagram showing the circuit configuration inside the printed board and the general configuration of the second fan motor device when a voltage detecting unit is further mounted on the printed board on which the current detecting device is mounted in another embodiment (f).

In the above-described embodiment, as shown in FIG. 12, a voltage detecting unit 14 may also be connected between the output and the GND of the motor-use power supply device 10a. The voltage detecting unit 14 detects the voltage value of the power outputted from the motor-use power supply device 10a. The voltage value that the voltage detecting device 14 has detected is imported to the control unit 11. Thus, the control unit 11 can use the voltage value that has been detected by the voltage detecting unit 14 and the motor current Im that has been calculated by the microcomputer 97 to calculate the motor power of the second fan motor 81. The control unit 11 can use this motor power to perform further control of the second fan motor 81 and various types of control of other devices included in the air conditioning apparatus 1.

g

Figure 13:
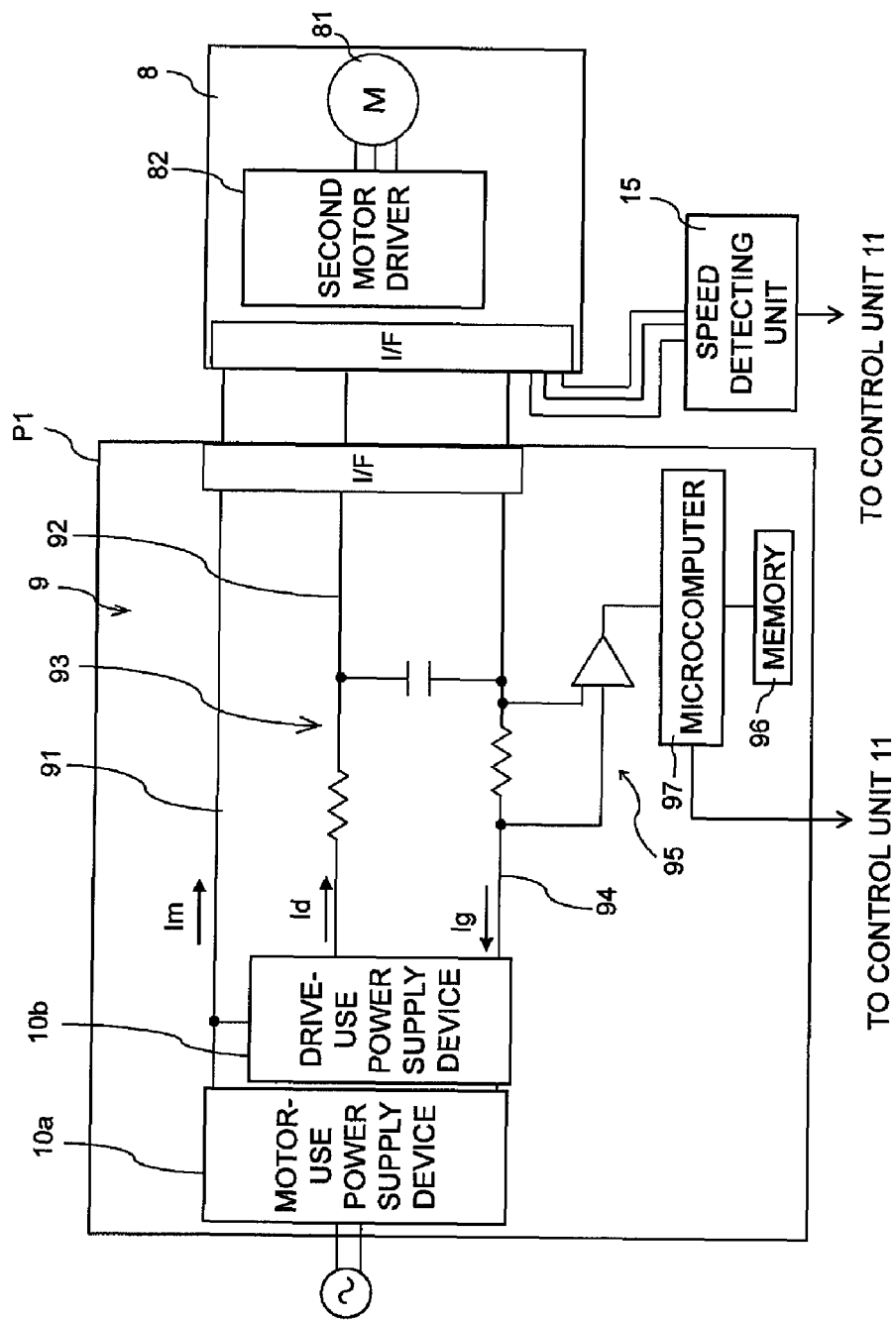
FIG. 13 is a diagram showing the circuit configuration inside the printed board and the general configuration of the second fan motor device when a speed detecting unit is connected to the second fan motor device in another embodiment (g).

In the above-described embodiment, as shown in FIG. 13, a speed detecting unit 15 for detecting the speed of the second fan motor 81 may also be directly attached to the second fan motor device 8. The speed detecting unit 15 may be any type of unit, such as a type of unit that is directly connected to the second fan motor device 8 and detects the speed of the second fan motor 81 as shown in FIG. 13, a type that detects the speed using an output signal from a Hall element that detects the position of the rotor with respect to the stator in the second fan motor 81, or a type that estimates the position of the rotor on the basis of the drive voltage that the second motor driver 82 outputs to the second fan motor 81 and uses the position of the rotor it has estimated to detect the speed. Of the aforementioned types, when the speed detecting unit 15 is a type other than the type that is directly connected to the second fan motor device 8, the speed detecting unit 15 may be mounted on the printed board P1 or may be mounted on another board different from the printed board P1. Further, the speed of the second fan motor 81 that the speed detecting unit 15 has detected is imported to the control unit 11.

Thus, the control unit 11 can use the speed of the second fan motor 81 that has been detected by the speed detecting unit 15 and the motor current Im that has been calculated by the microcomputer 97 to calculate the motor torque of the second fan motor 81. Consequently, the control unit 11 can use this motor torque to perform further control of the second fan motor 81 and various types of control of other devices included in the air conditioning apparatus 1.

h

Figure 14:
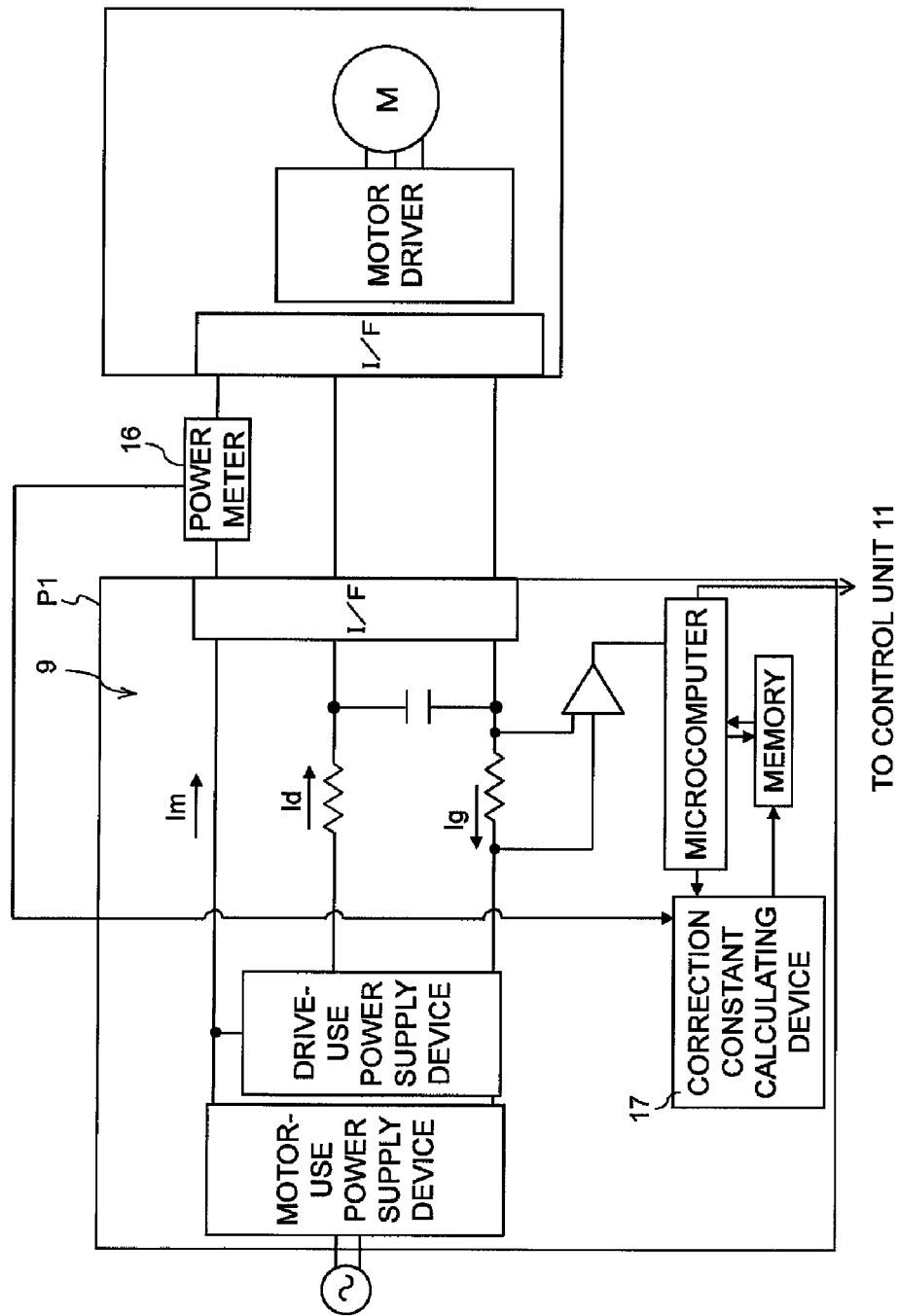
FIG. 14 is a diagram showing the configuration of the correction constant calculating system and the configuration inside the current detecting device when a correction constant calculating device is mounted on the printed board together with the current detecting device in another embodiment (h).

In the above-described embodiment, a case where the correction constant calculating device 17 that calculates the correction constant Ht is disposed separately from the current detecting device 9 and the power meter 16 as shown in FIG. 9 has been described. However, the correction constant calculating device 17 may also be mounted on the printed board P1 together with the current detecting device 9 as shown in FIG. 14, for example.

Figure 15:
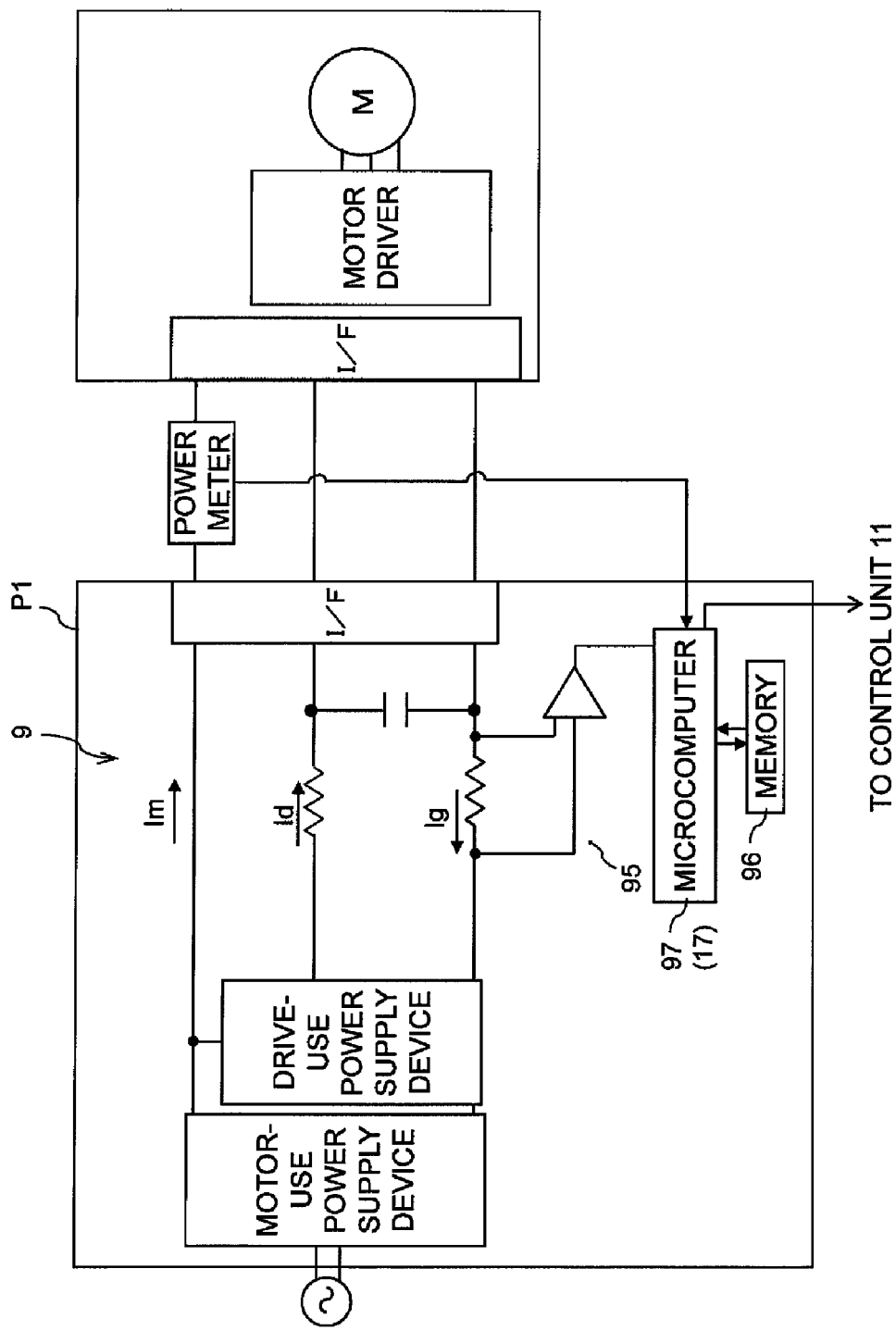
FIG. 15 is a diagram showing the configuration of the correction constant calculating system and the configuration inside the current detecting device when a microcomputer in the current detecting device functions as a functional unit that performs calculation of a correction constant and calculation of the motor current in another embodiment (h).

Further, rather than the correction constant calculating device 17 being disposed separately from the current detecting device 9, the microcomputer 97 may also perform the operation of calculating the correction constant Ht (FIG. 15). The microcomputer 97 in this case functions as a functional unit that calculates the correction constant Ht at the time of the production line of the current detecting device 9. Further, after the current detecting device 9 has been shipped in a state where the correction constant Ht is written in the memory 96, the microcomputer 97 functions as a functional unit that calculates the motor current Im like in the above-described embodiment and uses the correction constant Ht and the detection results of the current detecting unit 95 at those times to calculate the motor current Im.

i

In the above-described embodiment, a case where connection of the power meter 16 to the harness L1 and connection of the correction constant calculating device 17 to the current detecting unit 95 and the power meter 16 are performed by a user who uses the correction constant calculating system 101 has been described. However, these connection operations may also be performed automatically rather than being performed by the user of the correction constant calculating system 101. In this case, these connection operations can be realized as a result of the correction constant calculating device 17, for example, performing control of the connection operations.

j

In the above-described embodiment, a case where the control unit 11 separate from the microcomputer 97 of the current detecting device 9 performs control such as starting the rotation and stopping the rotation of the second fan motor 81 has been described. However, each of these controls of the second fan motor 81 may also be performed by the microcomputer 97 rather than being performed by the control unit 11.

k

In the above-described embodiment, a case where the correction constant Ht is calculated on the basis of three results of the detection result DIon of the current detecting unit 95 and the measurement result MIon of the power meter 16 at a time when the second fan motor 81 is rotating and the detection result DIoff of the current detecting unit 95 at a time when the second fan motor 81 is not rotating has been described. However, the results that are used when the correction constant Ht is calculated may also be more than three. For example, when the second fan motor 81 rotates at three different types of speeds, the correction constant calculating device 17 may also use the detection results of the current detecting unit 95 and the measurement results of the power meter 16 at each of the speeds (that is, six results) to calculate the correction constant Ht.

l

In the above-described embodiment, a case where the operation of calculating the correction constant Ht is performed in the process before shipment (specifically, on the production line) of the current detecting device 9 has been described. However, the time period when the operation of calculating the correction constant Ht is performed is not limited to this. The operation of calculating the correction constant Ht pertaining to the present invention may also be performed at the time of maintenance of the current detecting device 9 or the second fan motor device 8, for example.

INDUSTRIAL APPLICABILITY

The current detecting device pertaining to the present invention has the effect that, even when the drive current fluctuates, the motor current is accurately determined on the basis of the sum of the motor current that has been detected by the current detecting unit and the drive current that has been leveled, and the current detecting device can be applied to air conditioning apparatus. In particular, the correction constant calculating system and the correction constant calculating method have the effect that they can appropriately correct the detection result resulting from the current detecting unit because a correction constant matching the actual variation in the motor can be obtained. Consequently, the correction constant calculating system and the correction constant calculating method pertaining to the present invention can be applied as a system and a method that calculate a correction constant for accurately detecting a motor current in a fan motor in air conditioning apparatus.

What is claimed is:
1. A current detecting device connected to a motor device that includes a motor and a motor drive unit to drive the motor, the current detecting device comprising:
  a second wire configured and arranged to carry flow of a drive current that is passed through the motor drive unit;

a third wire configured and arranged to carry flow of a motor current that has been passed through the motor;
a current leveling unit electrically connected to the second wire, the current leveling unit being configured to level the drive current on the second wire;
a first wire electrically connected to the current leveling unit, the first wire being configured and arranged to carry flow of
the motor current after flowing through the motor and the drive current that has been leveled by the current leveling unit; and
a current detecting unit electrically connected to the current leveling unit and the first wire, the current detecting unit being configured to detect a sum of
the motor current flowing on the first wire and
the drive current that has been leveled flowing on the first wire.

2. The current detecting device according to claim 1, wherein
the current leveling unit has a resistor connected in series to the second wire and a capacitor connected to the second wire in parallel with respect to the resistor.

3. The current detecting device according to claim 1, further comprising
a storage unit electrically connected to the current detecting unit, the storage unit being configured to store a correction constant useable to correct a detection result obtained from the current detecting unit; and
a motor current calculating unit electrically connected to the current detecting unit, the motor current calculating unit being configured to calculate the motor current flowing on the third wire on the basis of the correction constant stored in the storage unit and the detection result obtained from the current detecting unit.

4. An air conditioning apparatus comprising:
a motor device, the motor device including a fan motor included in the motor device together with a motor drive unit, the fan motor being arranged and configured to have a motor current pass therethrough;
a current detecting device including
a second wire configured and arranged to carry flow of a drive current that is passed through the motor drive unit,
a third wire configured and arranged to carry flow of the motor current that has been passed through the motor,
a current leveling unit electrically connected to the second wire, the current leveling unit being configured to level the drive current on the second wire,
a first wire electrically connected to the current leveling unit, the first wire being configured and arranged to carry flow of
the motor current after flowing through the motor and the drive current that has been leveled by the current leveling unit,
a current detecting unit electrically connected to the current leveling unit and the first wire, the current detecting unit being configured to detect a sum of
the motor current flowing on the first wire and
the drive current that has been leveled flowing on the first wire,
a storage unit electrically connected to the current detecting unit, the storage unit being configured to store a correction constant useable to correct a detection result obtained from the current detecting unit, and
a motor current calculating unit electrically connected to the current detecting unit, the motor current calculating unit being configured to calculate the motor current flowing on the third wire on the basis of the correction constant stored in the storage unit and the detection result obtained from the current detecting unit;
a fan configured to be rotated by the fan motor; and
a control unit electrically connected to the motor device, the control unit being configured to control a volume of air sent into a room from the fan on the basis of the motor current that has been calculated by the motor current calculating unit of the current detecting device.

5. A correction constant calculating system comprising:
a current detecting device connected to a motor device that includes a motor and a motor drive unit to drive the motor the current detecting device including
a second wire configured and arranged to carry flow of a drive current that is passed through the motor drive unit,
a third wire configured and arranged to carry flow of the motor current that has been passed through the motor,
a current leveling unit electrically connected to the second wire, the current leveling unit being configured to level the drive current on the second wire,
a first wire electrically connected to the current leveling unit, the first wire being configured and arranged to carry flow of
the motor current after flowing through the motor and the drive current that has been leveled by the current leveling unit,
a current detecting unit electrically connected to the current leveling unit and the first wire, the current detecting unit being configured to detect a sum of
the motor current flowing on the first wire and
the drive current that has been leveled flowing on the first wire,
a storage unit electrically connected to the current detecting unit, the storage unit being configured to store a correction constant useable to correct a detection result obtained from the current detecting unit, and
a motor current calculating unit electrically connected to the current detecting unit, the motor current calculating unit being configured to calculate the motor current flowing on the third wire on the basis of the correction constant stored in the storage unit and the detection result obtained from the current detecting unit;
a power meter connected to the third wire of the current detecting device, the power meter being configured to measure the motor current flowing on the third wire; and
a correction constant calculating unit electrically connected to the current detecting device, the correction constant calculating unit being configured to calculate the correction constant on the basis of the detection result of the current detecting unit in the current detecting device and a measurement result obtained from the power meter,
the correction constant calculating unit being further configured to write the correction constant it has calculated in the storage unit of the current detecting device.

6. The correction constant calculating system according to claim 5, wherein
the correction constant calculating unit is further configured to perform operations of calculating and writing the correction constant before shipment of the current detecting device.

7. The correction constant calculating system according to claim 5, wherein
the correction constant calculating unit is further configured
to calculate the correction constant on the basis of the detection result of the current detecting unit and the measurement result of the power meter at a time when the motor is rotating and
to calculate the detection result of the current detecting unit at a time when the motor is not rotating.

8. A correction constant calculating method using a current detecting device connected to a motor device that includes a motor and a motor drive unit to drive the motor, the current detecting device including
a second wire configured and arranged to carry flow of a drive current that is passed through the motor drive unit,
a third wire configured and arranged to carry flow of a motor current that has been passed through the motor,
a current leveling unit electrically connected to the second wire, the current leveling unit being configured to level the drive current on the second wire,
a first wire electrically connected to the current leveling unit, the first wire being configured and arranged to carry flow of
the motor current after flowing through the motor and the drive current that has been leveled by the current leveling unit,
a current detecting unit electrically connected to the current leveling unit and the first wire, the current detecting unit being configured to detect a sum of
the motor current flowing on the first wire and
the drive current that has been leveled flowing on the first wire,
a storage unit electrically connected to the current detecting unit, the storage unit being configured to store a correction constant useable to correct a detection result obtained from the current detecting unit, and
a motor current calculating unit electrically connected to the current detecting unit, the motor current calculating unit being configured to calculate the motor current flowing on the third wire on the basis of the correction constant stored in the storage unit and the detection result obtained from the current detecting unit, the correction constant calculating method comprising:
connecting a power meter to the third wire;
measuring the motor current flowing on the third wire with the power meter;
calculating the correction constant using a correction constant calculating unit electrically connected to the current detecting device and the power meter on the basis of the detection result of the current detecting unit in the current detecting device;
calculating a measurement result obtained by the power meter using the correction constant calculating unit; and
writing the correction constant that has been calculated in the storage unit of the current detecting device.

9. The correction constant calculating method according to claim 8, wherein
the connecting of the power meter to the third wire, the measuring of the motor current flowing on the third wire, the calculating of the correction constant, the calculating of the measurement result and the writing of the correction constant are performed are performed before shipment of the current detecting device.

10. The correction constant calculating method according to claim 8, wherein
the correction constant is calculated on the basis of the detection result of the current detecting unit and the measurement result of the power meter at a time when the motor is rotating, and
the detection result of the current detecting unit is calculated at a time when the motor is not rotating.

11. The current detecting device according to claim 2, further comprising
a storage unit electrically connected to the current detecting unit, the storage unit being configured to store a correction constant useable to correct a detection result obtained from the current detecting unit; and
a motor current calculating unit electrically connected to the current detecting unit, the motor current calculating unit being configured to calculate the motor current flowing on the third wire on the basis of the correction constant stored in the storage unit and the detection result obtained from the current detecting unit.

12. The correction constant calculating system according to claim 6, wherein
the correction constant calculating unit is further configured
to calculate the correction constant on the basis of the detection result of the current detecting unit and the measurement result of the power meter at a time when the motor is rotating and
to calculate the detection result of the current detecting unit at a time when the motor is not rotating.

13. The correction constant calculating method according to claim 9, wherein
the correction constant is calculated on the basis of the detection result of the current detecting unit and the measurement result of the power meter at a time when the motor is rotating, and
the detection result of the current detecting unit is calculated at a time when the motor is not rotating.

* * * * *